United States Patent
Ausen et al.

(10) Patent No.: US 12,220,853 B2
(45) Date of Patent: Feb. 11, 2025

(54) EXTRUDING CONNECTED HOLLOW STRANDS

(71) Applicant: 3M INNOVATIVE PROPERTIES COMPANY, St. Paul, MN (US)

(72) Inventors: Ronald W. Ausen, St. Paul, MN (US); William J. Kopecky, Hudson, WI (US); Vasav Sahni, St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 238 days.

(21) Appl. No.: 17/632,807

(22) PCT Filed: Aug. 6, 2020

(86) PCT No.: PCT/IB2020/057450
§ 371 (c)(1),
(2) Date: Feb. 4, 2022

(87) PCT Pub. No.: WO2021/028798
PCT Pub. Date: Feb. 18, 2021

(65) Prior Publication Data
US 2022/0266495 A1  Aug. 25, 2022

Related U.S. Application Data

(60) Provisional application No. 62/885,523, filed on Aug. 12, 2019.

(51) Int. Cl.
*B29C 48/11*   (2019.01)
*B29C 48/335*  (2019.01)
*B29C 48/92*   (2019.01)
*B29L 23/00*   (2006.01)

(52) U.S. Cl.
CPC ............ *B29C 48/11* (2019.02); *B29C 48/337* (2019.02); *B29C 48/92* (2019.02); *B29C 2948/92647* (2019.02); *B29C 2948/92704* (2019.02); *B29C 2948/92904* (2019.02); *B29L 2023/22* (2013.01)

(58) Field of Classification Search
CPC ........ B29C 48/11; B29C 48/337; B29C 48/92
USPC ........................................................ 428/220
See application file for complete search history.

(56) References Cited

U.S. PATENT DOCUMENTS

| | | | |
|---|---|---|---|
| 3,019,147 A * | 1/1962 | Nalle, Jr. | ........... B29C 48/09 428/36.1 |
| 3,471,588 A | 10/1969 | Kanner | |
| 3,650,870 A | 3/1972 | Dietzsch | |
| 5,948,517 A | 9/1999 | Adamko | |

(Continued)

FOREIGN PATENT DOCUMENTS

| | | |
|---|---|---|
| DE | 3304236 | 8/1984 |
| EP | 3234956 | 10/2017 |

(Continued)

OTHER PUBLICATIONS

International Search Report for PCT International Application No. PCT/IB2020/057450, mailed on Oct. 12, 2020, 4 pages.

*Primary Examiner* — Tahseen Khan
(74) *Attorney, Agent, or Firm* — Thomas M. Spielbauer; Lynn R. Hunsberger

(57) ABSTRACT

A web. The web includes an array of discrete polymeric tubes; a plurality of spacer segments between at least a plurality of adjacent polymeric tubes; wherein polymeric tubes are hollow polymeric tubes; wherein the web is a continuous web.

13 Claims, 20 Drawing Sheets

(56) References Cited

U.S. PATENT DOCUMENTS

| | | | |
|---|---|---|---|
| 6,228,449 B1 | 5/2001 | Meyer | |
| 6,348,249 B2 | 2/2002 | Meyer | |
| 6,465,107 B1 | 10/2002 | Kelly | |
| 2012/0222679 A1* | 9/2012 | Angadjivand | B01D 39/1623 |
| | | | 156/243 |
| 2014/0220328 A1 | 8/2014 | Ausen | |
| 2015/0238783 A1* | 8/2015 | Nguyen | A62B 18/02 |
| | | | 128/205.27 |

FOREIGN PATENT DOCUMENTS

| | | | |
|---|---|---|---|
| EP | 3259767 | 12/2017 | |
| EP | 3357073 | 8/2018 | |
| GB | 861447 * | 2/1961 | |
| GB | 861447 A1 * | 2/1961 | |
| GB | 2060811 | 5/1981 | |
| GB | 2060811 A * | 5/1981 | ......... B29C 47/0028 |
| WO | WO 1996-039349 | 12/1996 | |
| WO | WO-0079206 A1 * | 12/2000 | ......... B29C 47/0028 |
| WO | WO-2017117206 A1 * | 7/2017 | ............. B65H 75/10 |
| WO | WO 2020-003066 | 1/2020 | |
| WO | WO 2020-170115 | 8/2020 | |

* cited by examiner

EXTRUDING CONNECTED HOLLOW STRANDS

CROSS REFERENCE TO RELATED APPLICATIONS

This application is a national stage filing under 35 U.S.C. 371 of PCT/IB2020/057450, filed Aug. 6, 2020, which claims the benefit of U.S. Provisional Patent Application No. 62/885,523, filed Aug. 12, 2019, the disclosure of which is incorporated by reference in its/their entirety herein.

BACKGROUND

Methods for making webs and continuous extruded tubing are known in the art. Today, many types of tubes and hoses are made with polymer materials (e.g., polyethylene) that are extruded using an extruder and extrusion die.

Relatively smaller sized tubing, such as capillary tubing and hollow fiber, require precision dies for consistent tube shape. This is because the flow rate of material is very dependent upon the resistance within the die. Small changes in the cavity size have significant effects on the resultant extruded part. Thus, for uniformity of flow, passageway resistance within the die is critical to the formation of uniform tubing.

Hollow fiber and capillary tubing can provide mass transfer if the tubing wall is permeable, and thermal transfer if the tubing wall is thermally conductive. It can provide padding and cushioning with elastomeric materials. The small size of the tubing can result in difficulty in managing multiple tubes at one time.

Connected webs of small sized tubing can be useful for padding and cushioning of fragile elements. The small tubes provide an air barrier for compression. Small tubing webs can be useful for heat transfer applications (e.g., battery, electronic, and mechanical apparatus cooling). The small tubing size enables close contact with the cooling media to the apparatus to be cooled. Small tubing webs may also be used as spacer layers to minimize weight.

There exists a need for alterative tube configurations and methods to make them.

SUMMARY

In one aspect, the present disclosure describes a web comprising, an array of discrete polymeric tubes; a plurality of spacer segments between at least a plurality of adjacent polymeric tubes; wherein polymeric tubes are hollow polymeric tubes; wherein the web is a continuous web.

In another aspect, the present disclosure herein describes a method of making the web of the present disclosure, the method comprising: providing an extrusion die comprising a plurality of shims positioned adjacent to one another, the shims together defining at least a first cavity, a second cavity, and a third cavity, and a dispensing surface, wherein the dispensing surface has an array of alternating dispensing orifices, wherein the plurality of shims comprises a plurality of a repeating sequence of shims, wherein the repeating sequence comprises: shims that provide a fluid passageway between the second cavity and a second plurality of orifices, and shims that provide a fluid passageway between the first cavity to a first plurality of enclosed polygon shaped orifices, and also that provide a third passageway extending from a third cavity to a third plurality of orifices located within the enclosed polygon orifice area; and dispensing first polymeric tubes from the first dispensing orifices while simultaneously dispensing spacer segments from the second dispensing orifices, and providing an open air passageway for the third cavity and the third dispensing orifices.

In another aspect, the present disclosure herein describes a method of making the web of the present disclosure, the method comprising: providing an extrusion die comprising an array of orifices positioned close to one another such that material dispensed from the orifices welds together once they exit the orifices, wherein a first die cavity is connected to a plurality of enclosed polygon shaped orifices, a second die cavity is connected to a plurality of spacer orifices, and a third cavity is connected to a third plurality of orifices located within the enclosed polygon orifice area; and dispensing first polymeric tubes from the first dispensing orifices while simultaneously dispensing spacer segments from the second dispensing orifices, and providing an open air passageway for the third cavity and the third dispensing orifices.

DETAILED DESCRIPTION

Figure 1:
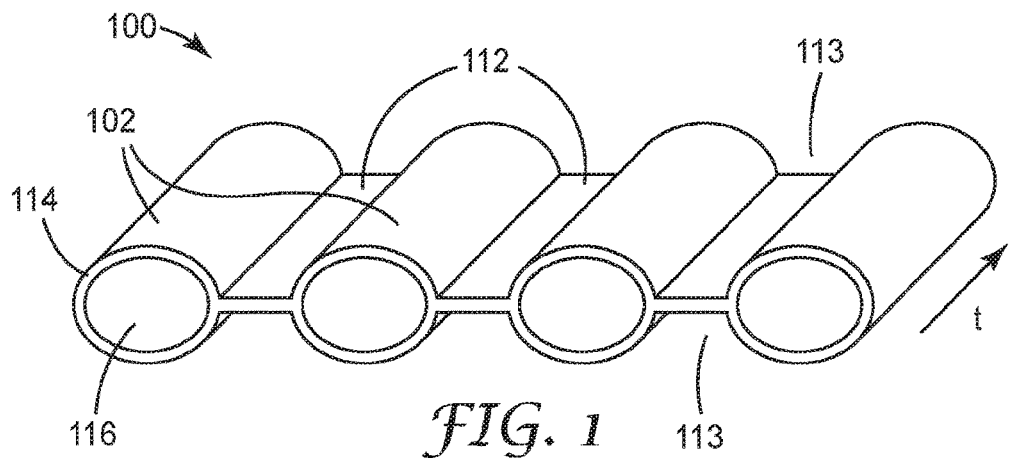
FIG. 1 is a schematic cross-sectional view of an exemplary coextruded polymeric article described herein.

Referring to FIG. 1, exemplary web 100 comprises array of discrete polymeric tubes 102. Spacer segments 112 are between adjacent polymeric tubes 102. These spacer segments are formed at the same time as the tubes and are welded together with the tubes to form a continuous web. Spacer segments provide uniform arrangement and spacing of tubing. Areas 113 are formed between adjacent tubes. In some embodiments the areas 113 above and below the spacer segments may be filled with thermally conductive materials (i.e., materials having a thermal conductivity of at least 0.5 watt per meter kelvin). Spacer segments 112 may enable a large portion of tube perimeter to be in contact with thermally conductive material. In some embodiments, the portion of tube perimeter accessible for heat transfer as high as 60 percent of the perimeter, in some cases greater than 80%. Polymeric tubes 102 can be hollow polymeric tubes (i.e., a hollow core 116 with a sheath 114 surrounding the hollow core). As shown in FIG. 1, web 100 can be a continuous web. As shown in exemplary web 100 of FIG. 1, polymeric tubes 102 are within the same plane.

Figure 2:
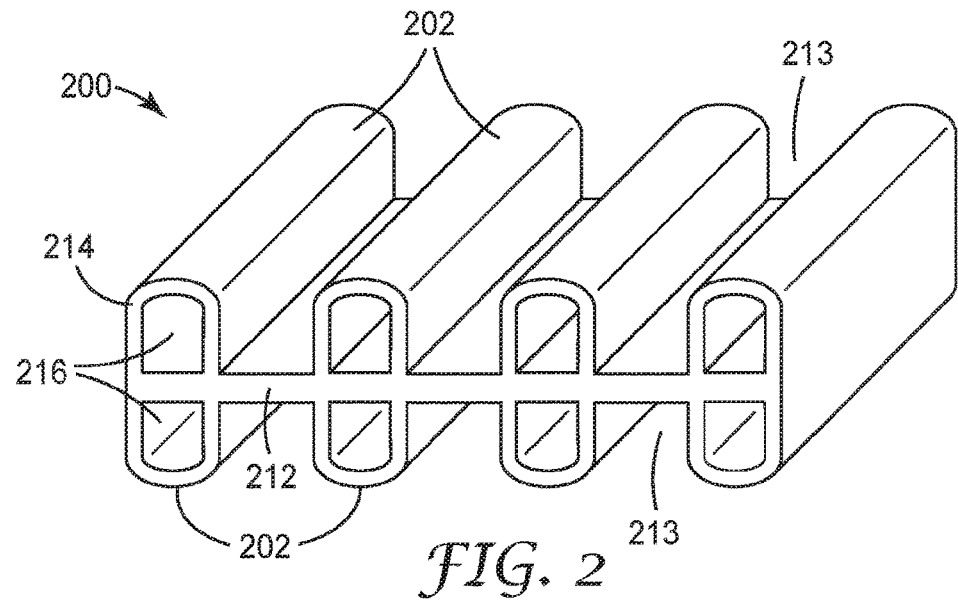
FIG. 2 is a schematic cross-sectional view of another exemplary coextruded polymeric article described herein.

Referring to FIG. 2, exemplary web 200 comprises array of discrete polymeric tubes 202. Space segments 212 are between adjacent polymeric tubes 202. These spacer segments are formed at the same time as the tubes and are welded together with the tubes to form a continuous web. Spacer segments provide uniform arrangement and spacing of tubes. Areas 213 are formed between adjacent tubes. In some embodiments the areas 213 above and below the connecting spacer segments may be filled with thermally conductive materials (i.e., materials having a thermal conductivity of at least 0.5 watt per meter kelvin). Spacer segments 212 enable a large portion of tube perimeter to be in contact with thermally conductive material. In some embodiments the portion of tube perimeter accessible for heat transfer as high as 60 percent of the perimeter, in some cases greater than 80%. Polymeric tubes 202 can be hollow polymeric tubes (i.e., a hollow core 216 with a sheath 214 surrounding the hollow core). As shown in FIG. 2, web 200 can be a continuous web. As shown in exemplary web 200 of FIG. 2, polymeric tubes 202 are within two planes. In some other embodiments, polymeric tubes 202 can be within more than two planes.

Figure 3:
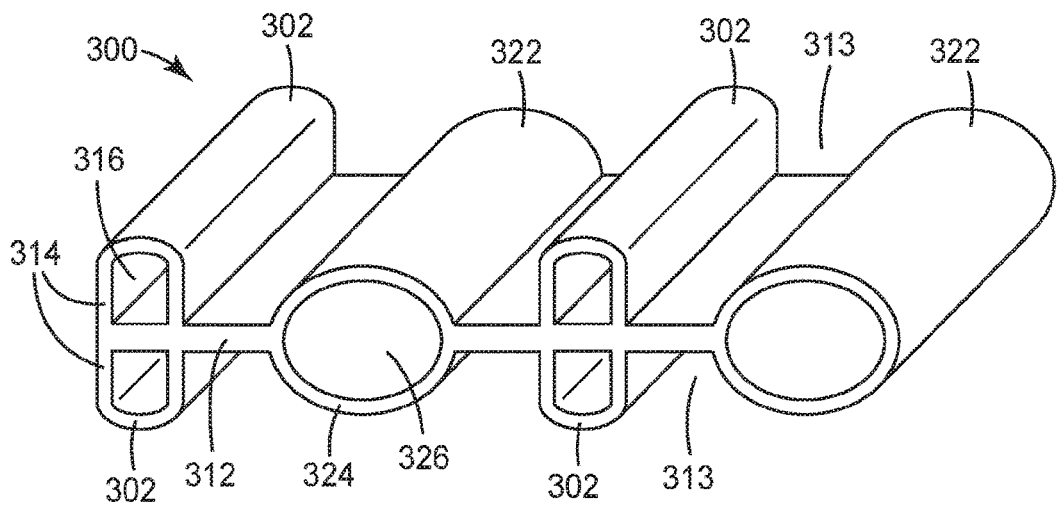
FIG. 3 is a schematic cross-sectional view of another exemplary coextruded polymeric article described herein.

Referring to FIG. 3, exemplary web 300 comprises a first array of discrete polymeric tubes 302 and a second array of discrete polymeric tubes 322. In some embodiments, discrete polymeric tubes 302 and 322 are alternatively spaced. For example, one polymeric tube 322 is in between two polymeric tubes 302. Space segments 312 are between adjacent polymeric tube 302 and 322. These spacer segments are formed at the same time as the tubes and are welded together with the tubes to form a continuous web. Spacer segments provide uniform arrangement and spacing of tubing. Areas 313 are formed between adjacent tubes. In some embodiments the areas 313 above and below the connecting spacer segments may be filled with thermally conductive materials (i.e., materials having a thermal conductivity of at least 0.5 watt per meter kelvin). Spacer segments 312 enable a large portion of tube perimeter to be in contact with thermally conductive material. In some embodiments the portion of tube perimeter accessible for heat transfer as high as 60 percent of the perimeter, in some cases greater than 80%. Polymeric tubes 302 and 322 can be hollow polymeric tubes (i.e., a hollow core 316 or 326 with a sheath 314 or 324 surrounding the hollow core). As shown in FIG. 3, web 300 can be a continuous web. As shown in exemplary web 300 of FIG. 3, the cross-section of polymeric tubes 302 and 332 have different shapes. In some other embodiments, the cross-section of polymeric tubes 302 and 332 can have same shapes.

Embodiments of webs described herein can be made, for example by a method comprising: providing an extrusion die comprising a plurality of shims positioned adjacent to one another, the shims together defining at least a first cavity, a second cavity, and a third cavity, and a dispensing surface, wherein the dispensing surface has an array of alternating dispensing orifices, wherein the plurality of shims comprises a plurality of a repeating sequence of shims, wherein the repeating sequence comprises: shims that provide a fluid passageway between the second cavity and a second plurality of orifices, and shims that provide a fluid passageway between the first cavity to a first plurality of enclosed polygon shaped orifices, and also that provide a third passageway extending from a third cavity to a third plurality of orifices located within the enclosed polygon orifice area; and dispensing first polymeric tubes from the first dispensing orifices while simultaneously dispensing spacer segments from the second dispensing orifices, and providing an open air passageway for the third cavity and the third dispensing orifices. In some embodiments, the third passageway is filled with air or gas and free of other material. In some embodiments, dispensing filler material (e.g., a fluid) from the third dispensing orifices.

Embodiments of webs described herein can be made, for example by a method comprising: providing an extrusion die comprising an array of orifices positioned close to one another such that material dispensed from the orifices welds together once they exit the orifices, wherein a first die cavity is connected to a plurality of enclosed polygon shaped orifices, a second die cavity is connected to a plurality of spacer orifices, and a third cavity is connected to a third plurality of orifices located within the enclosed polygon orifice area; and dispensing first polymeric tubes from the first dispensing orifices while simultaneously dispensing spacer segments from the second dispensing orifices, and providing an open air passageway for the third cavity and the third dispensing orifices.

In some embodiments, the first dispensing orifices and the second dispensing orifices are collinear. In some embodiments, the first dispensing orifices are collinear, and the second dispensing orifices are also collinear but offset from and not collinear with the first dispensing orifices.

In some embodiments, extrusion dies described herein include a pair of end blocks for supporting the plurality of shims. In these embodiments it may be convenient for one or all of the shims to each have one or more through-holes for the passage of connectors between the pair of end blocks. Bolts disposed within such through-holes are one convenient approach for assembling the shims to the end blocks, although the ordinary artisan may perceive other alternatives for assembling the extrusion die. In some embodiments, the at least one end block has an inlet port for introduction of fluid material into one, or both, of the cavities.

Figure 16:
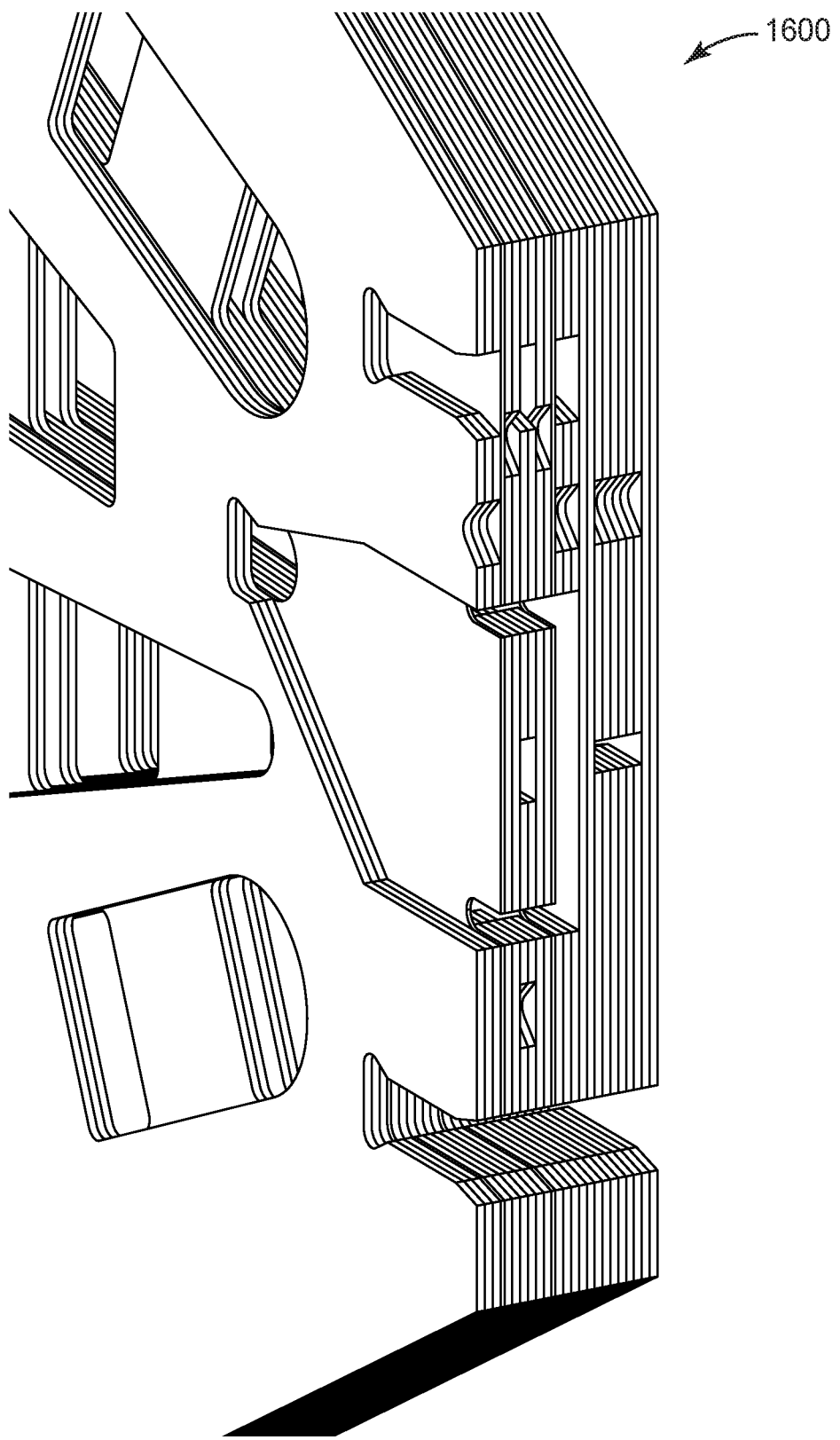
FIG. 16 is a perspective assembly drawing of several different exemplary sequences of shims employing the shims of FIGS. 7A, 8A, 9A, 10A, 11A, and 15A for making exemplary coextruded polymeric articles described herein, segments and protrusions in a repeating arrangement as shown in FIG. 1.
Figure 17:
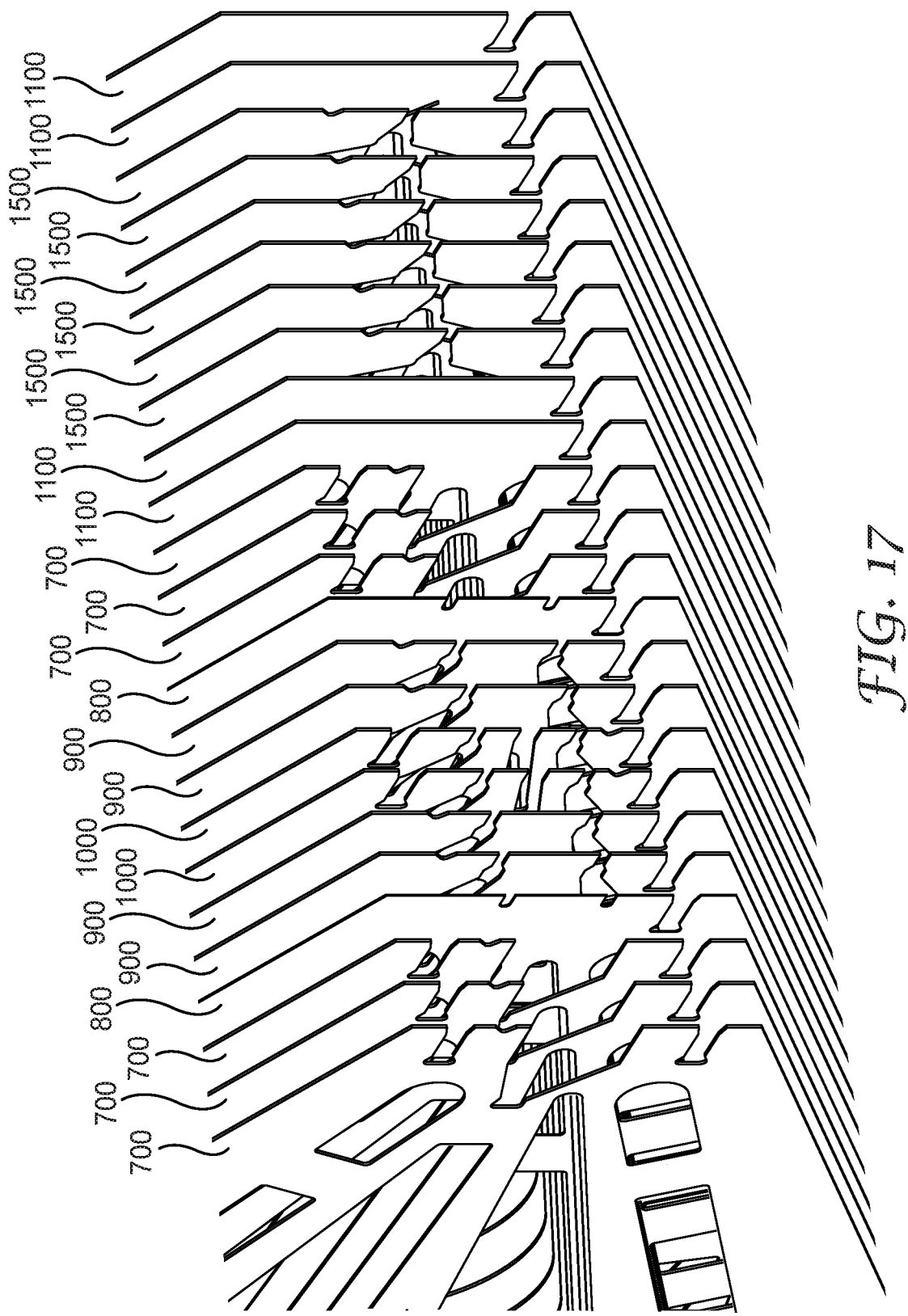
FIG. 17 is a perspective view of the some of the sequence of shims of FIG. 16, further exploded to reveal some individual shims.

In some embodiments, the shims will be assembled according to a plan that provides a repeating sequence of shims of diverse types. The repeating sequence can have diverse numbers of shims per repeat. For example, a twenty-four shim repeating sequence that can provide a web with a single-material tube alternating with a core/sheath tube is shown in FIGS. 16-17, which are further described below.

Exemplary passageway cross-sectional shapes include square and rectangular shapes. The shape of the passageways within, for example, a repeating sequence of shims, may be identical or different. For example, in some embodiments, the shims that provide a passageway between the first cavity and a first dispensing orifice might have a flow restriction compared to the shims that provide a conduit between the second cavity and a second dispensing orifice. The width of the distal opening within, for example, a repeating sequence of shims, may be identical or different. For example, the portion of the distal opening provided by the shims that provide a conduit between the first cavity and a first dispensing orifice could be narrower than the portion of the distal opening provided by the shims that provide a conduit between the second cavity and a second dispensing orifice.

In some embodiments, the assembled shims (conveniently bolted between the end blocks) further comprise a manifold body for supporting the shims. The manifold body has at least one (or more (e.g., two, three, four, or more)) manifold therein, the manifold having an outlet. An expansion seal (e.g., made of copper or alloys thereof) is disposed so as to seal the manifold body and the shims, such that the expansion seal defines a portion of at least one of the cavities (in some embodiments, a portion of both the first and second cavities), and such that the expansion seal allows a conduit between the manifold and the cavity.

Typically, the passageway between cavity and dispensing orifice is up to 5 mm in length. Sometimes the first array of fluid passageways has greater fluid restriction than the second array of fluid passageways.

In some embodiments, for extrusion dies described herein, each of the dispensing orifices of the first and the second arrays have a cross sectional area, and each of the dispensing orifices of the first arrays has an area different than that of the second array.

The shims for dies described herein typically have thicknesses in the range from 50 micrometers to 125 micrometers, although thicknesses outside of this range may also be useful. Typically, the fluid passageways have thicknesses in a range from 50 micrometers to 750 micrometers, and lengths less than 5 mm (with generally a preference for smaller lengths for decreasingly smaller passageway thicknesses), although thicknesses and lengths outside of these ranges may also be useful. For large diameter fluid passageways several smaller thickness shims may be stacked together, or single shims of the desired passageway width may be used.

The shims are tightly compressed to prevent gaps between the shims and polymer leakage. For example, 12 mm (0.5 inch) diameter bolts are typically used and tightened, at the extrusion temperature, to their recommended torque rating. Also, the shims are aligned to provide uniform extrusion out the extrusion orifice, as misalignment can lead to tubes extruding at an angle out of the die which inhibits desired bonding of the net. To aid in alignment, an alignment key can be cut into the shims. Also, a vibrating table can be useful to provide a smooth surface alignment of the extrusion tip.

Figure 4:
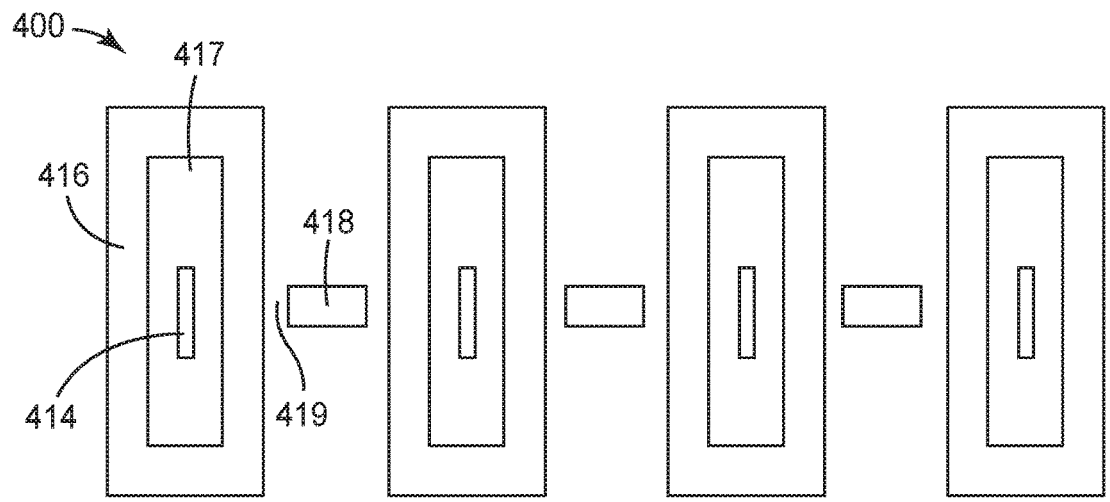
FIG. 4 is a schematic cross-sectional view of an exemplary die orifice pattern just upstream from the dispensing slot of the die employed in the formation of an exemplary coextruded polymeric article described herein.

FIG. 4 is a schematic cross-sectional view of an exemplary die orifice pattern just upstream from the dispensing slot of the die employed in the formation of an exemplary coextruded polymeric article described herein. Orifice plan 400 shows first orifices 414, and second orifices 416. Area 417 separates orifice 414 and 416 and helps to create the center of the tube. Orifice 414 is used to fill the tube with air. Third orifice 418 is positioned between orifices 416 and helps to create connecting film between tubes. Orifice 416 is a continuous orifice and creates a unitary circular tube structure. The gap 419 between orifice 418 and orifice 416 creates a demarcation line when polymer streams merge together once the exit the extrusion orifices. The demarcation lines are created at orifices separated by a minimal amount, by spacer shims. These shims typically have thicknesses in a range from 50 to 200 micrometers. Gap 419 enables bonding in the machine direction between the tube and film segment. Expansion of the tube diameter with internal air pressure and die swell of polymers immediately at the exit of the die enable welding of molten polymers from adjacent orifices to create a continuous web of tube and spacer segments.

Figure 5:
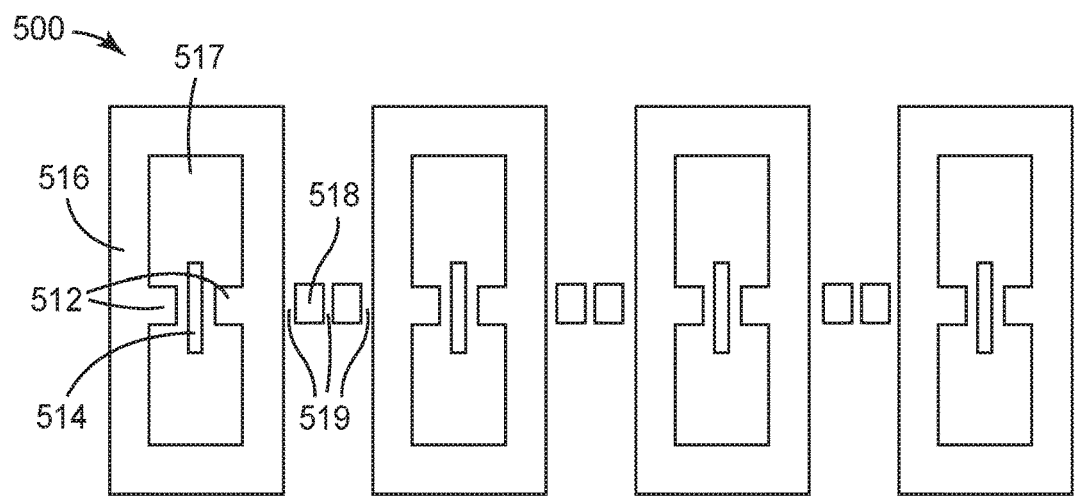
FIG. 5 is a schematic cross-sectional view of an exemplary die orifice pattern just upstream from the dispensing slot of the die employed in the formation of an exemplary coextruded polymeric article described herein.

FIG. 5 is a schematic cross-sectional view of an exemplary die orifice pattern just upstream from the dispensing slot of the die employed in the formation of an exemplary coextruded polymeric article described herein. Orifice plan 500 shows first orifices 514, and second orifices 516. Area 517 separates orifice 514 and 516 and helps to create the center of the tube. Orifice 514 is used to fill the tube with air. Third orifice 518 is positioned between orifices 516 and helps to create connecting film between tubes. Orifice 516 is a continuous orifice and creates a unitary circular tube structure. The gap 519 between orifice 518 and orifice 516 creates a demarcation line when polymer streams merge together once the exit the extrusion orifices. The demarcation lines are created at orifices separated by a minimal amount, by spacer shims. These shims typically have thicknesses in a range from 50 to 200 micrometers. The gap 519 enables bonding in the machine direction between the tube and film segment. Area 512 helps to create the continuous segment within the tube.

Figure 6:
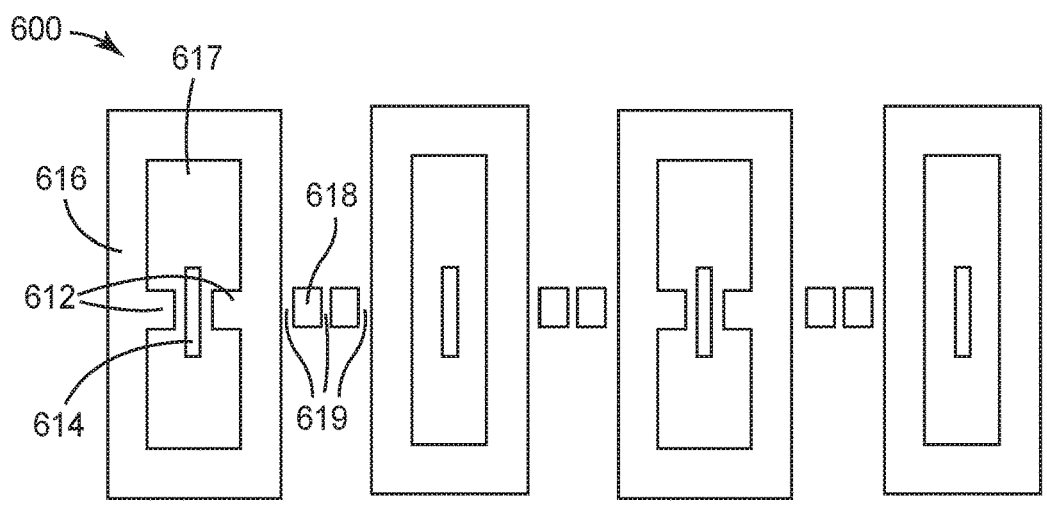
FIG. 6 is a schematic cross-sectional view of an exemplary die orifice pattern just upstream from the dispensing slot of the die employed in the formation of an exemplary coextruded polymeric article described herein.

FIG. 6 is a schematic cross-sectional view of an exemplary die orifice pattern just upstream from the dispensing slot of the die employed in the formation of an exemplary coextruded polymeric article described herein. Orifice plan 600 shows first orifices 614, and second orifices 616. Area 617 separates orifice 614 and 616 and helps to create the center of the tube. Orifice 614 is used to fill the tube with air. Third orifice 618 is positioned between orifices 616 and helps to create connecting film between tubes. Orifice 616 is a continuous orifice and creates a unitary circular tube structure. The gap 619 between orifice 618 and orifice 616 creates a demarcation line when polymer streams merge together once the exit the extrusion orifices. The demarcation lines are created at orifices separated by a minimal amount, by spacer shims. These shims typically have thicknesses in a range from 50 to 200 micrometers. The gap 619 enables bonding in the machine direction between the tube and film segment. Area 612 helps to create the continuous segment within the tube.

Figure 7A:
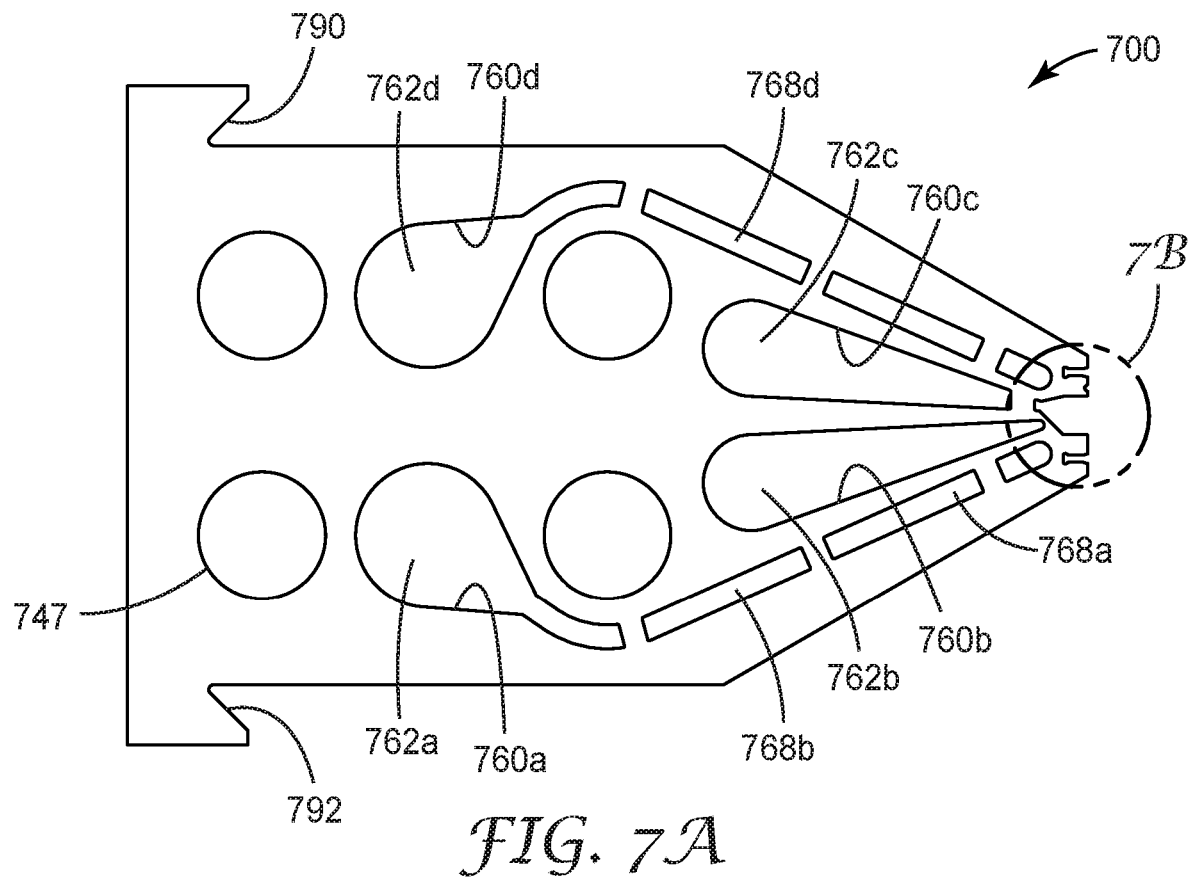
FIG. 7A is a plan view of an exemplary embodiment of a shim suited to form a sequence of shims capable of forming an exemplary coextruded polymeric article, for example, as shown in the schematic cross-sectional views of FIGS. 1, 2, and 3.
Figure 7B:
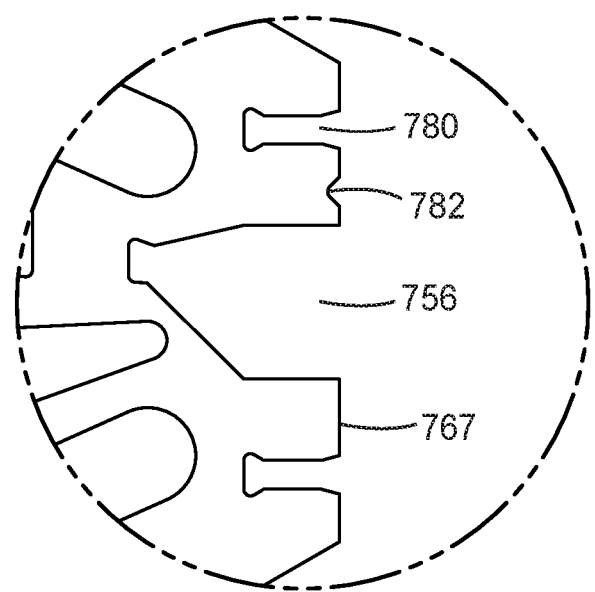
FIG. 7B is an expanded region near the dispensing surface of the shim shown in FIG. 7A.
Figure 18:
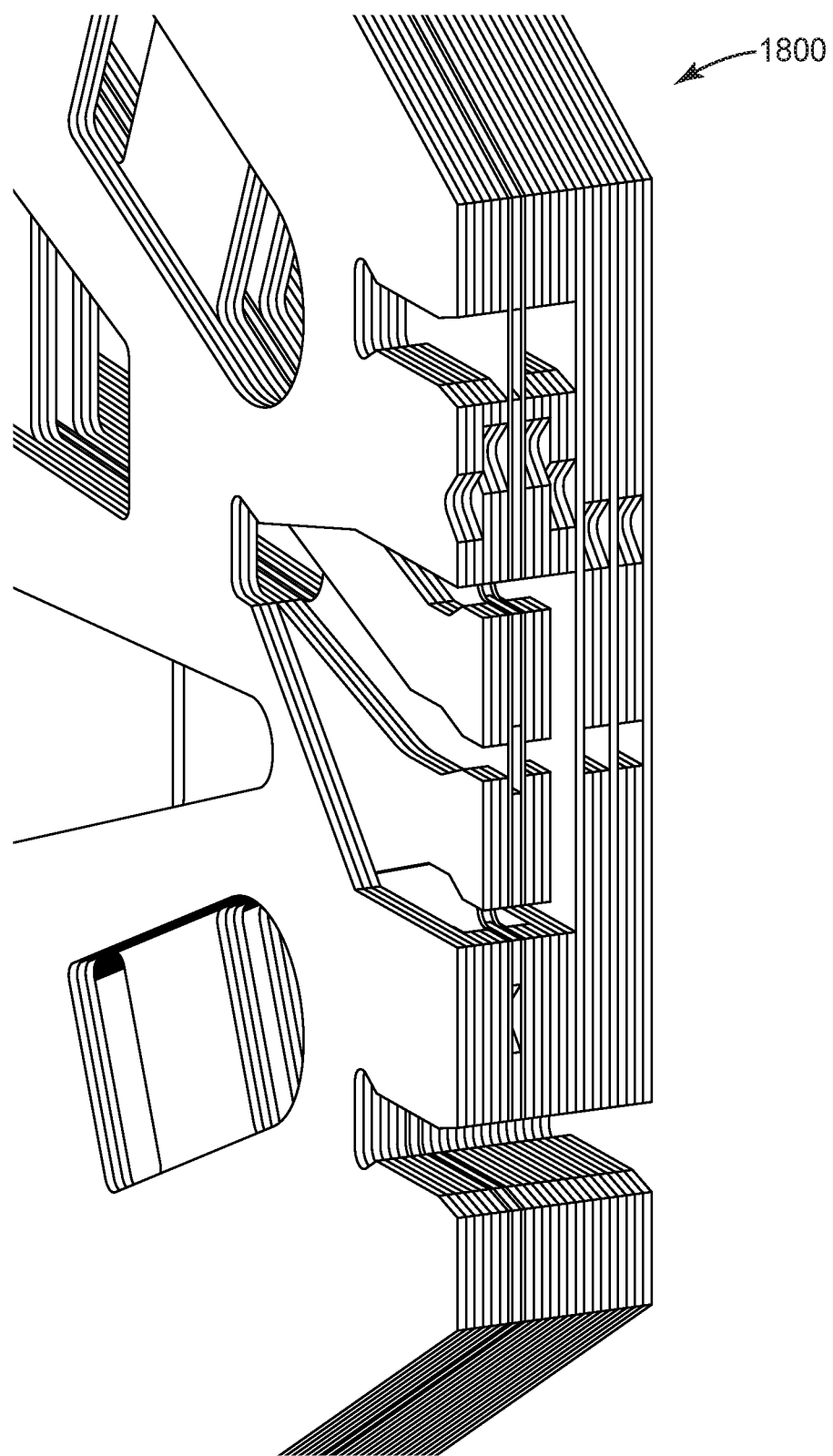
FIG. 18 is a perspective assembly drawing of several different exemplary sequences of shims employing the shims of FIGS. 7A, 8A, 10A, 11A, 13A, and 14A for making exemplary coextruded polymeric articles described herein, segments and protrusions in a repeating arrangement as shown in FIG. 2.
Figure 20:
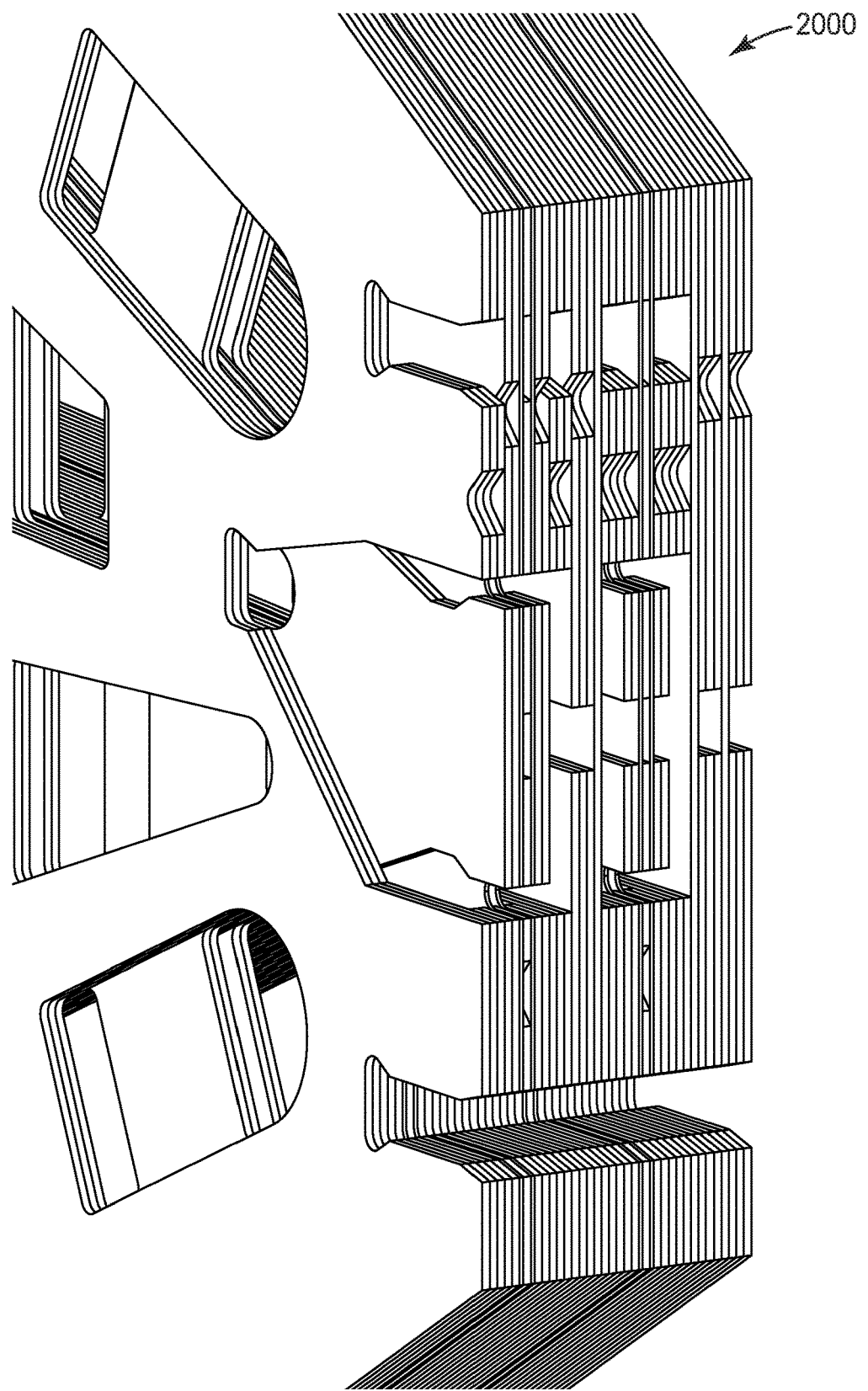
FIG. 20 is a perspective assembly drawing of several different exemplary sequences of shims employing the shims of FIGS. 7A, 8A, 9A, 10A, 11A, and 12A for making exemplary coextruded polymeric articles described herein, segments and protrusions in a repeating arrangement as shown in FIG. 3.

Referring now to FIGS. 7A and 7B, a plan view of shim 700 is illustrated. Shim 700 has first aperture 760*a*, second aperture 760*b*, third aperture 760*c*, and fourth aperture 760*d*. When shim 700 is assembled with others as shown in FIGS. 16, 18, and 20, aperture 760*a* aids in defining first cavity 762*a*, aperture 760*b* aids in defining second cavity 762*b*, aperture 760*c* aids in defining third cavity 762*c*, and aperture 760*d* aids in defining third cavity 762*d*. Passageways 768*a*, and 768*d* cooperate with analogous passageways on adjacent shims to allow passage from cavities 762*a* and 762*d* to the dispensing surfaces of the appropriate shims when the shims are assembled as shown in FIGS. 16, 18, and 20.

Shim 700 has several holes 747 to allow the passage of, for example, bolts, to hold shim 700 and others to be described below into an assembly. Shim 700 also has dispensing surface 767, and in this embodiment, dispensing surface 767 has indexing groove 780 which can receive an appropriately shaped key to ease assembling diverse shims into a die. The shim may also have identification notch 782 to help verify that the die has been assembled in the desired manner. This embodiment has shoulders 790 and 792 which can assist in mounting the assembled die with a mount of the type shown in FIG. 23. Shim 700 has dispensing opening 756. Dispensing opening 756 has connection to cavity 762*c* and provides the sidewall structure of the tube illustrated in FIGS. 1, 2, and 3.

Figure 8A:
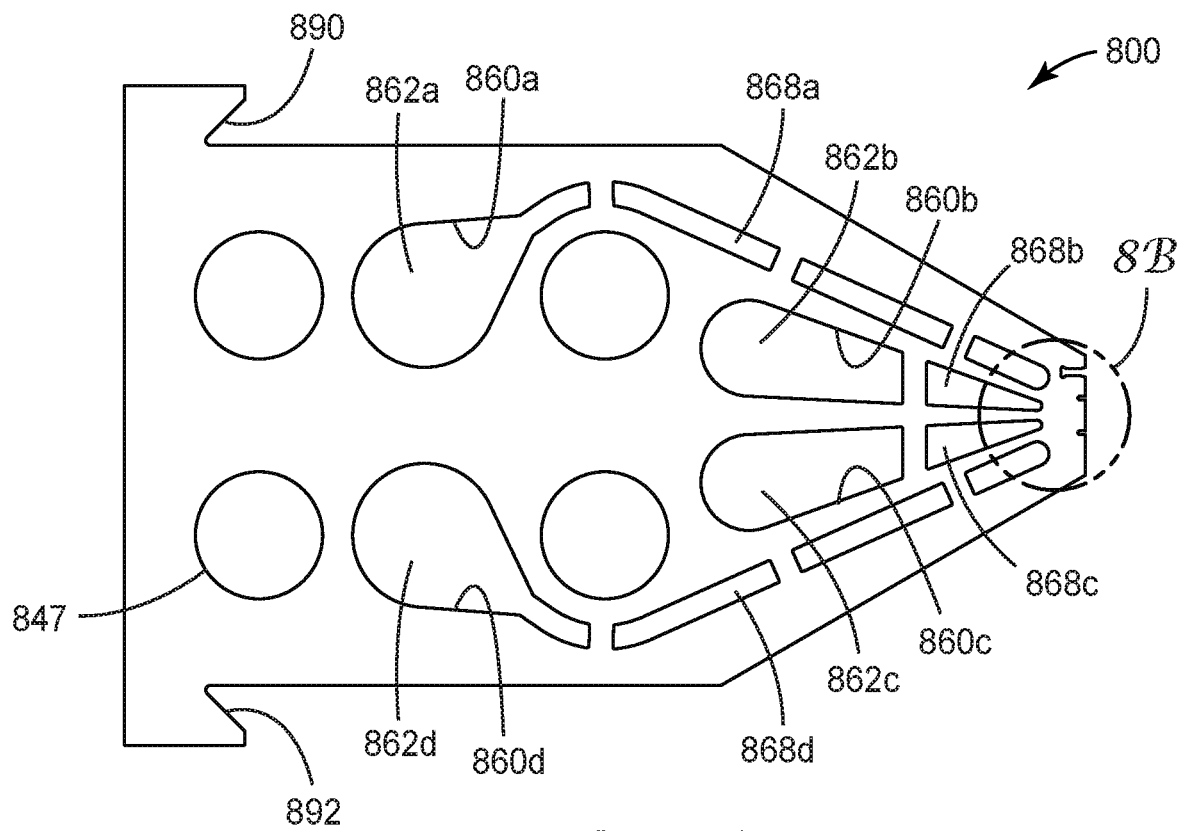
FIG. 8A is a plan view of an exemplary embodiment of a shim suited to form a sequence of shims capable of forming a coextruded polymeric article, for example, as shown in the schematic cross-sectional views of FIGS. 1, 2, and 3.
Figure 8B:
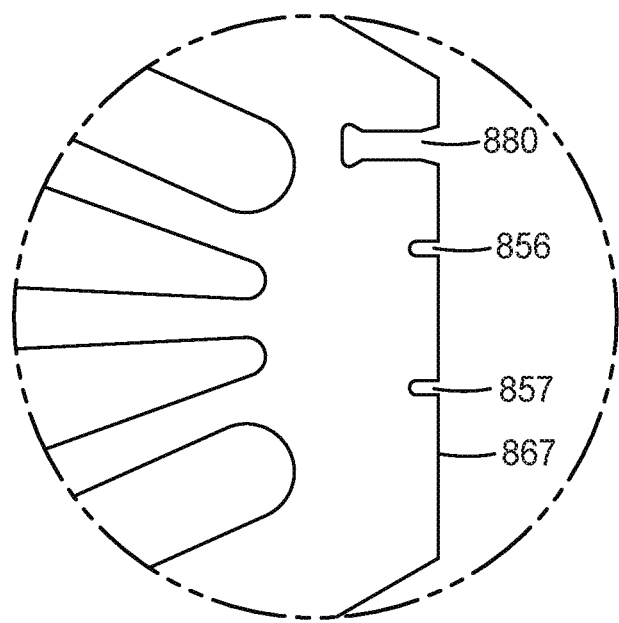
FIG. 8B is an expanded region near the dispensing surface of the shim shown in FIG. 8A.

Referring now to FIGS. 8A and 8B, a plan view of shim 800 is illustrated. Shim 800 has first aperture 860*a*, second aperture 860*b*, third aperture 860*c*, and fourth aperture 860*d*. When shim 800 is assembled with others as shown in FIGS. 16, 18, and 20, aperture 860*a* aids in defining first cavity 862*a*, aperture 860*b* aids in defining second cavity 862*b*, aperture 860*c* aids in defining third cavity 862*c*, and aperture 860*d* aids in defining third cavity 862*d*. Passageways 868*a*, 868*b*, 868*c*, and 868*d* cooperate with analogous passageways on adjacent shims to allow passage from cavities 862*a*, 862*b*, 862*c*, and 862*d* to the dispensing surfaces of the appropriate shims when the shims are assembled as shown in FIGS. 16, 18, and 20.

Shim 800 has several holes 847 to allow the passage of, for example, bolts, to hold shim 800 and others to be described below into an assembly. Shim 800 also has dispensing surface 867, and in this embodiment, dispensing surface 867 has indexing groove 880 which can receive an appropriately shaped key to ease assembling diverse shims into a die. The shim may also have identification notch 882 to help verify that the die has been assembled in the desired manner. This embodiment has shoulders 890 and 892 which can assist in mounting the assembled die with a mount of the type shown in FIG. 23. Shim 800 has dispensing opening 856, and 857. Dispensing opening 856 and 857 has no connection to the cavities. This is because shim 800 is a spacer shim, providing passageway formation between passageways.

Figure 9A:
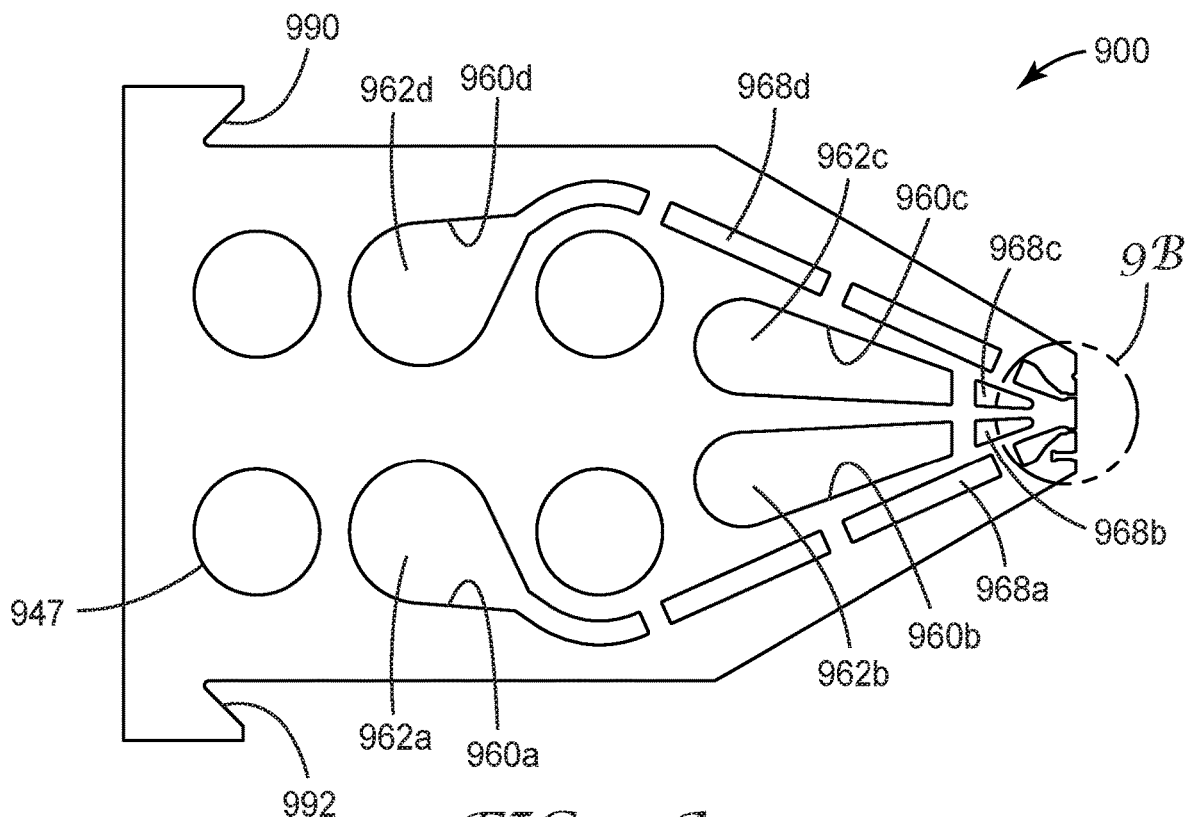
FIG. 9A is a plan view of an exemplary embodiment of a shim suited to form a sequence of shims capable of forming a coextruded polymeric article, for example, as shown in the schematic cross-sectional views of FIGS. 1 and 3.
Figure 9B:
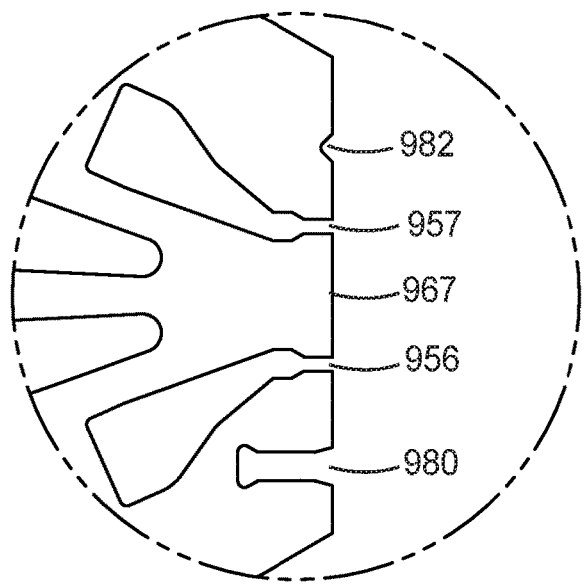
FIG. 9B is an expanded region near the dispensing surface of the shim shown in FIG. 9A.

Referring now to FIGS. 9A and 9B, a plan view of shim 900 is illustrated. Shim 900 has first aperture 960*a*, second aperture 960*b*, third aperture 960*c*, and fourth aperture 960*d*. When shim 900 is assembled with others as shown in FIGS. 16 and 20, aperture 960*a* aids in defining first cavity 962*a*, aperture 960*b* aids in defining second cavity 962*b*, aperture 960*c* aids in defining third cavity 962*c*, and aperture 960*d* aids in defining third cavity 962*d*. Passageways 968*a*, 968*b*, 968*c*, and 968*d* cooperate with analogous passageways on adjacent shims to allow passage from cavities 962*a*, 962*b*, 962*c*, and 962*d* to the dispensing surfaces of the appropriate shims when the shims are assembled as shown in FIGS. 16 and 20.

Shim 900 has several holes 947 to allow the passage of, for example, bolts, to hold shim 900 and others to be described below into an assembly. Shim 900 also has dispensing surface 967, and in this embodiment, dispensing surface 967 has indexing groove 980 which can receive an appropriately shaped key to ease assembling diverse shims into a die. The shim may also have identification notch 982 to help verify that the die has been assembled in the desired manner. This embodiment has shoulders 990 and 992 which can assist in mounting the assembled die with a mount of the type shown in FIG. 23. Shim 900 has dispensing opening 956 and 957. Dispensing opening 956 has connection to cavity 962*a* and opening 957 has connection to cavity 962*d* and provides the top and bottom structure of the tube illustrated in FIGS. 1 and 3.

Figure 10A:
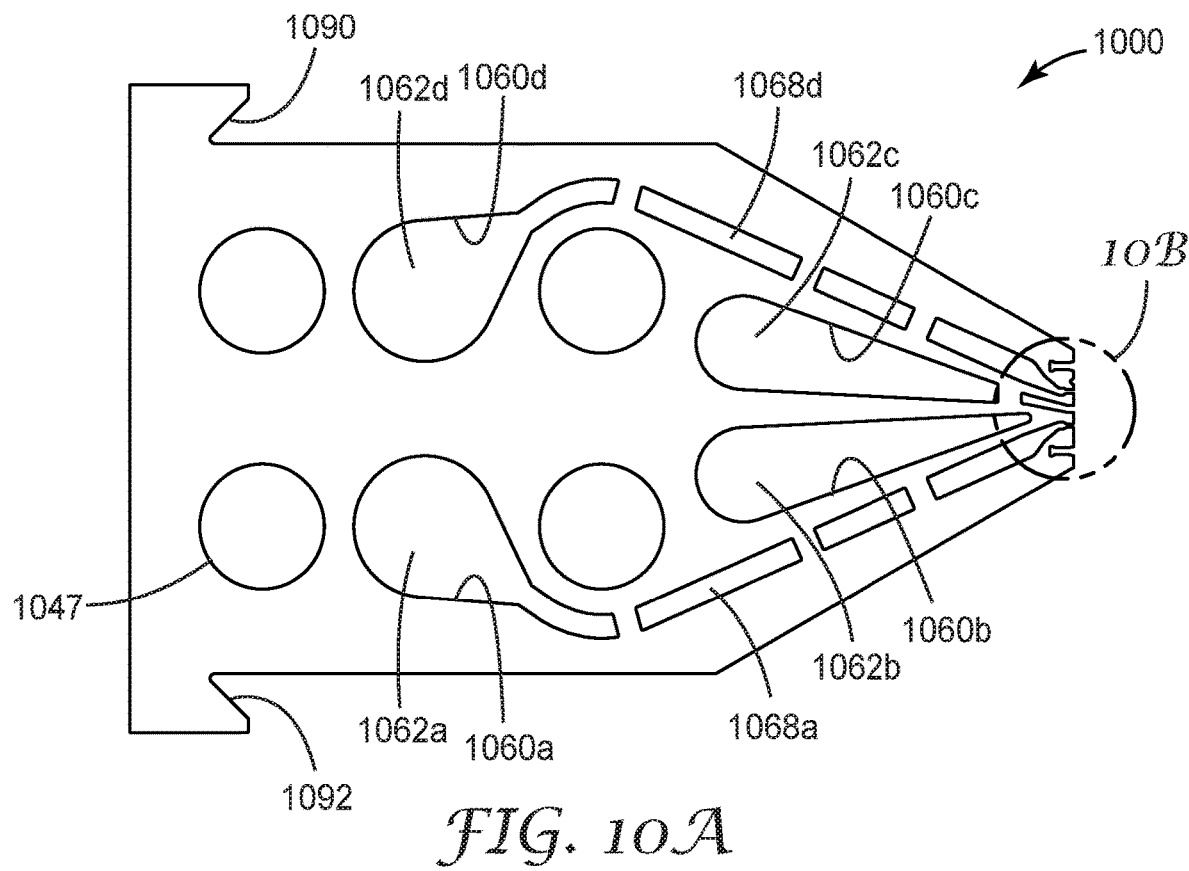
FIG. 10A is a plan view of an exemplary embodiment of a shim suited to form a sequence of shims capable of forming a coextruded polymeric article, for example, as shown in the schematic cross-sectional views of FIGS. 1, 2, and 3.
Figure 10B:
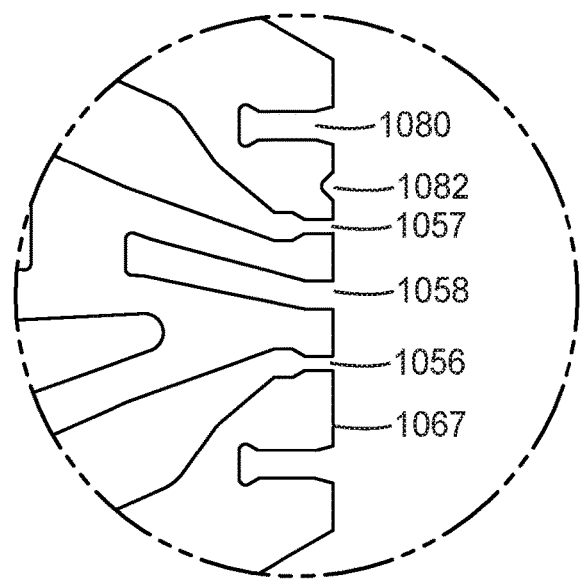
FIG. 10B is an expanded region near the dispensing surface of the shim shown in FIG. 10A.

Referring now to FIGS. 10A and 10B, a plan view of shim 1000 is illustrated. Shim 1000 has first aperture 1060*a*, second aperture 1060*b*, third aperture 1060*c*, and fourth aperture 1060*d*. When shim 1000 is assembled with others as shown in FIGS. 16, 18, and 20, aperture 1060*a* aids in defining first cavity 1062*a*, aperture 1060*b* aids in defining second cavity 1062*b*, aperture 1060*c* aids in defining third cavity 1062*c*, and aperture 1060*d* aids in defining third cavity 1062*d*. Passageways 1068*a* and 1068*d* cooperate with analogous passageways on adjacent shims to allow passage from cavities 1062*a* and 1062*d* to the dispensing surfaces of the appropriate shims when the shims are assembled as shown in FIGS. 16, 18 and 20.

Shim 1000 has several holes 1047 to allow the passage of, for example, bolts, to hold shim 1000 and others to be described below into an assembly. Shim 1000 also has dispensing surface 1067, and in this embodiment, dispensing surface 1067 has indexing groove 1080 which can receive an appropriately shaped key to ease assembling diverse shims into a die. The shim may also have identification notch 1082 to help verify that the die has been assembled in the desired manner. This embodiment has shoulders 1090 and 1092 which can assist in mounting the assembled die with a mount of the type shown in FIG. 23. Shim 1000 has dispensing opening 1056, 1057, and 1058. Dispensing opening 1056 has connection to cavity 1062*a*, opening 1057 has connection to cavity 1062*d*, and 1058 has connection to cavity 1062*c*. Opening 1056 and 1057 provides the top and bottom structure of the tube illustrated in FIGS. 1, 2 and 3.

Figure 11:
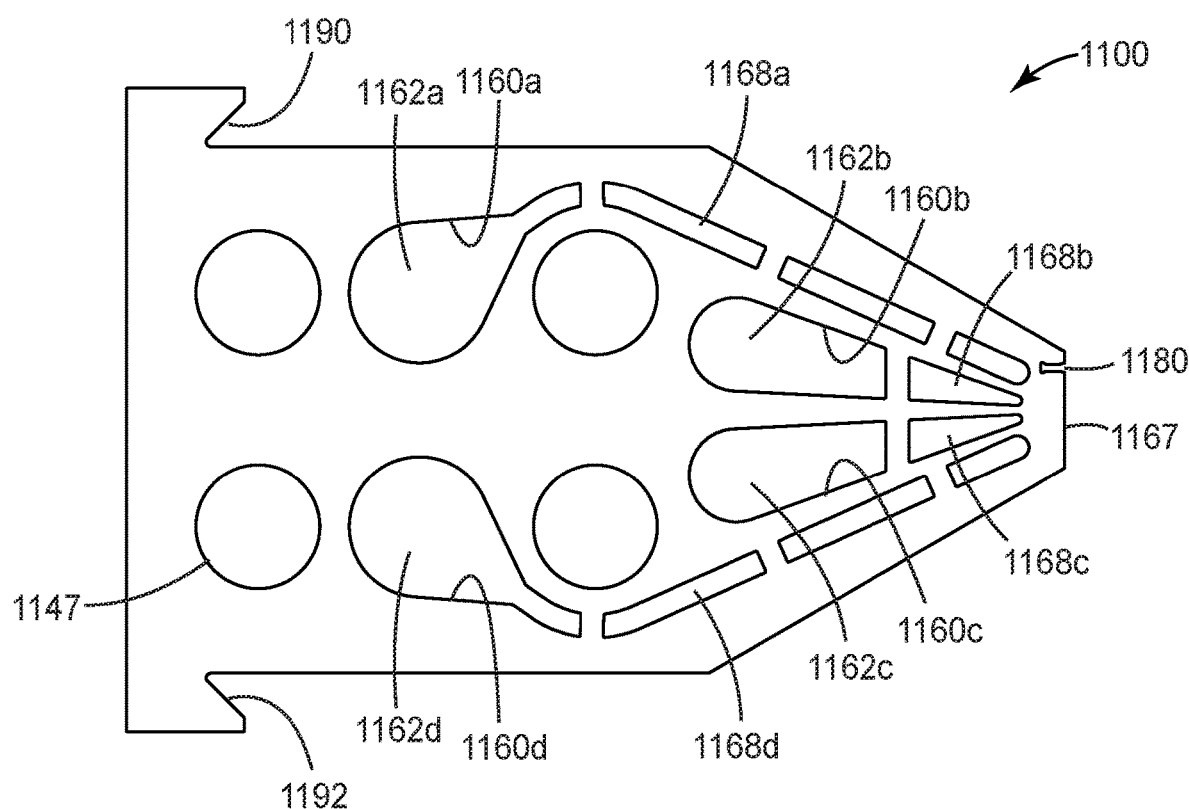
FIG. 11 is a plan view of an exemplary embodiment of a shim suited to form a sequence of shims capable of forming a coextruded polymeric article, for example, as shown in the schematic cross-sectional views of FIGS. 1, 2, and 3.

Referring now to FIG. 11, a plan view of shim 1100 is illustrated. Shim 1100 has first aperture 1160*a*, second aperture 1160*b*, third aperture 1160*c*, and fourth aperture 1160*d*. When shim 1100 is assembled with others as shown in FIGS. 16, 18, and 20, aperture 1160*a* aids in defining first cavity 1162*a*, aperture 1160*b* aids in defining second cavity 1162*b*, aperture 1160*c* aids in defining third cavity 1162*c*, and aperture 1160*d* aids in defining third cavity 1162*d*. Passageways 1168*a*, 1168*b*, 1168*c*, and 1168*d* cooperate with analogous passageways on adjacent shims to allow passage from cavities 1162*a*, 1162*b*, 1162*c*, and 1162*d* to the dispensing surfaces of the appropriate shims when the shims are assembled as shown in FIGS. 16, 18, and 20.

Shim 1100 has several holes 1147 to allow the passage of, for example, bolts, to hold shim 1100 and others to be described below into an assembly. Shim 1100 also has dispensing surface 1167, and in this embodiment, dispensing surface 1167 has indexing groove 1180 which can receive an appropriately shaped key to ease assembling diverse shims into a die. This embodiment has shoulders 1190 and 1192 which can assist in mounting the assembled die with a mount of the type shown in FIG. 23. Shim 1100 does not have dispensing openings. This is because shim 1100 is a spacer shim, providing passageway formation between passageways.

Figure 12A:
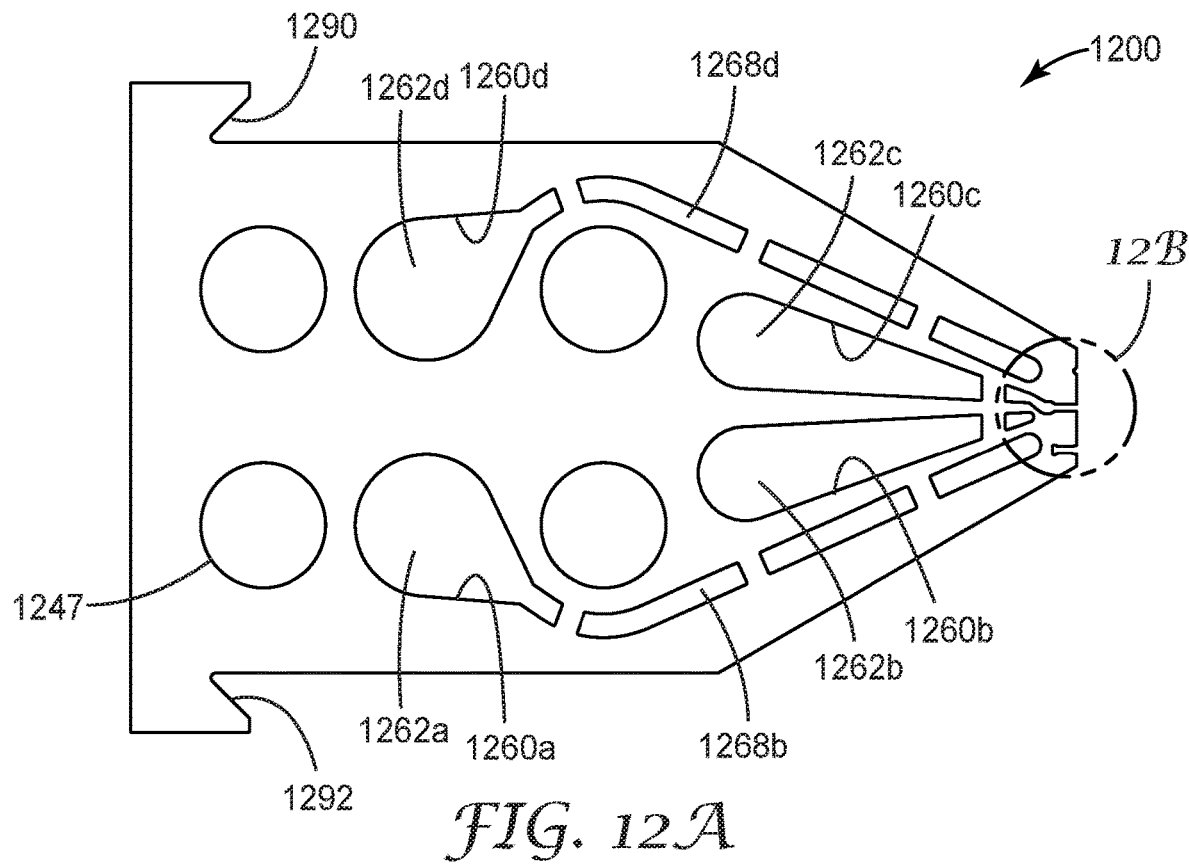
FIG. 12A is a plan view of an exemplary embodiment of a shim suited to form a sequence of shims capable of forming a coextruded polymeric article, for example, as shown in the schematic cross-sectional views of FIG. 3.
Figure 12B:
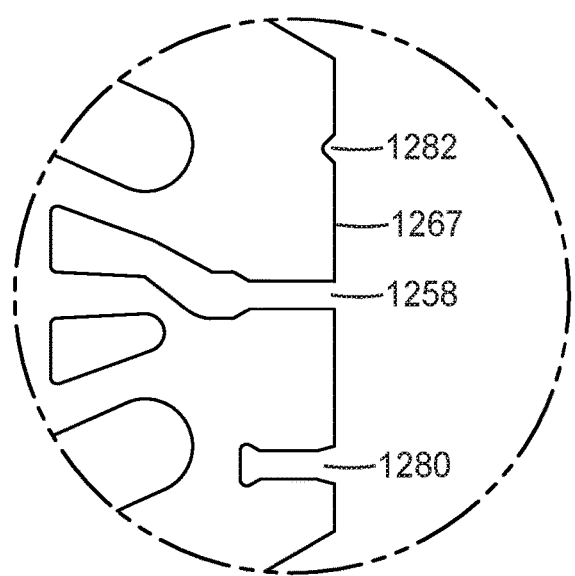
FIG. 12B is an expanded region near the dispensing surface of the shim shown in FIG. 12A.

Referring now to FIGS. 12A and 12B, a plan view of shim 1200 is illustrated. Shim 1200 has first aperture 1260*a*, second aperture 1260*b*, third aperture 1260*c*, and fourth aperture 1260*d*. When shim 1200 is assembled with others as shown in FIG. 20, aperture 1260*a* aids in defining first cavity 1262*a*, aperture 1260*b* aids in defining second cavity 1262*b*, aperture 1260*c* aids in defining third cavity 1262*c*, and aperture 1260*d* aids in defining third cavity 1262*d*. Passageways 1268*a* and 1268*d* cooperate with analogous passageways on adjacent shims to allow passage from cavities 1262*a* and 1262*d* to the dispensing surfaces of the appropriate shims when the shims are assembled as shown in FIG. 20.

Shim 1200 has several holes 1247 to allow the passage of, for example, bolts, to hold shim 1200 and others to be described below into an assembly. Shim 1200 also has dispensing surface 1267, and in this embodiment, dispensing surface 1267 has indexing groove 1280 which can receive an appropriately shaped key to ease assembling diverse shims into a die. The shim may also have identification notch 1282 to help verify that the die has been assembled in the desired manner. This embodiment has shoulders 1290 and 1292 which can assist in mounting the assembled die with a mount of the type shown in FIG. 23. Shim 1200 has dispensing opening 1258. Dispensing opening 1258 has connection to cavity 1262*c*. Opening 1258 provides the connecting film structure between tubes illustrated in FIG. 3.

Figure 13A:
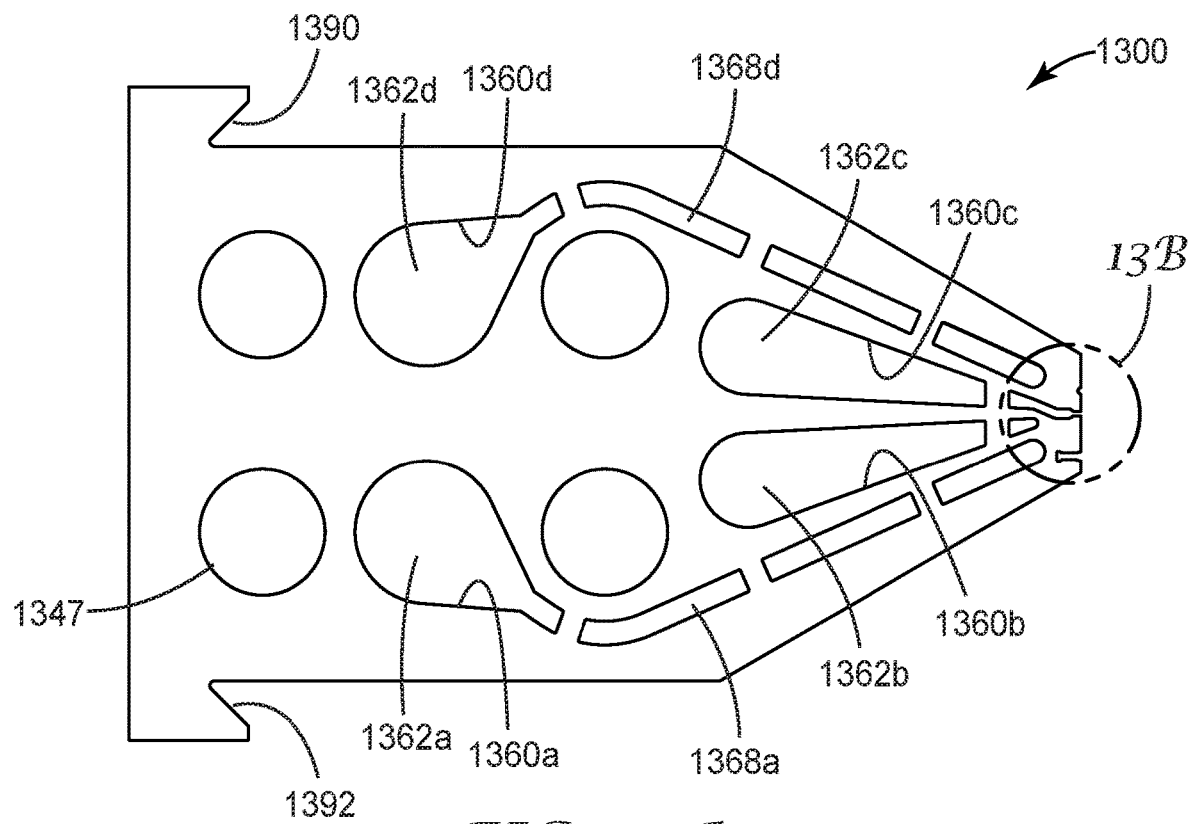
FIG. 13A is a plan view of an exemplary embodiment of a shim suited to form a sequence of shims capable of forming a coextruded polymeric article, for example, as shown in the schematic cross-sectional views of FIG. 2.
Figure 13B:
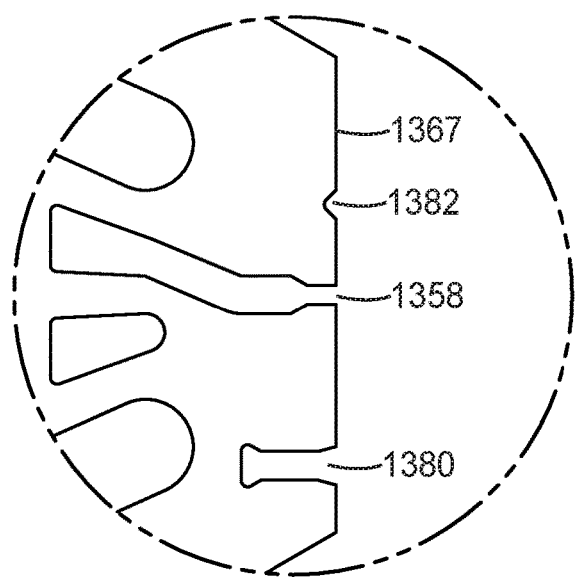
FIG. 13B is an expanded region near the dispensing surface of the shim shown in FIG. 13A.

Referring now to FIGS. 13A and 13B, a plan view of shim 1300 is illustrated. Shim 1300 has first aperture 1360*a*, second aperture 1360*b*, third aperture 1360*c*, and fourth aperture 1360*d*. When shim 1300 is assembled with others as shown in FIG. 18, aperture 1360*a* aids in defining first cavity 1362*a*, aperture 1360*b* aids in defining second cavity 1362*b*, aperture 1360*c* aids in defining third cavity 1362*c*, and aperture 1360*d* aids in defining third cavity 1362*d*. Passageways 1368*a* and 1368*d* cooperate with analogous passageways on adjacent shims to allow passage from cavities 1362*a* and 1362*d* to the dispensing surfaces of the appropriate shims when the shims are assembled as shown in FIG. 18.

Shim 1300 has several holes 1347 to allow the passage of, for example, bolts, to hold shim 1300 and others to be described below into an assembly. Shim 1300 also has dispensing surface 1367, and in this embodiment, dispensing surface 1367 has indexing groove 1380 which can receive an appropriately shaped key to ease assembling diverse shims into a die. The shim may also have identification notch 1382 to help verify that the die has been assembled in the desired manner. This embodiment has shoulders 1390 and 1392 which can assist in mounting the assembled die with a mount of the type shown in FIG. 23. Shim 1300 has dispensing opening 1358. Dispensing opening 1358 has connection to cavity 1362*c*. Opening 1358 provides the connecting film structure between tubes illustrated in FIG. 2.

Figure 14A:
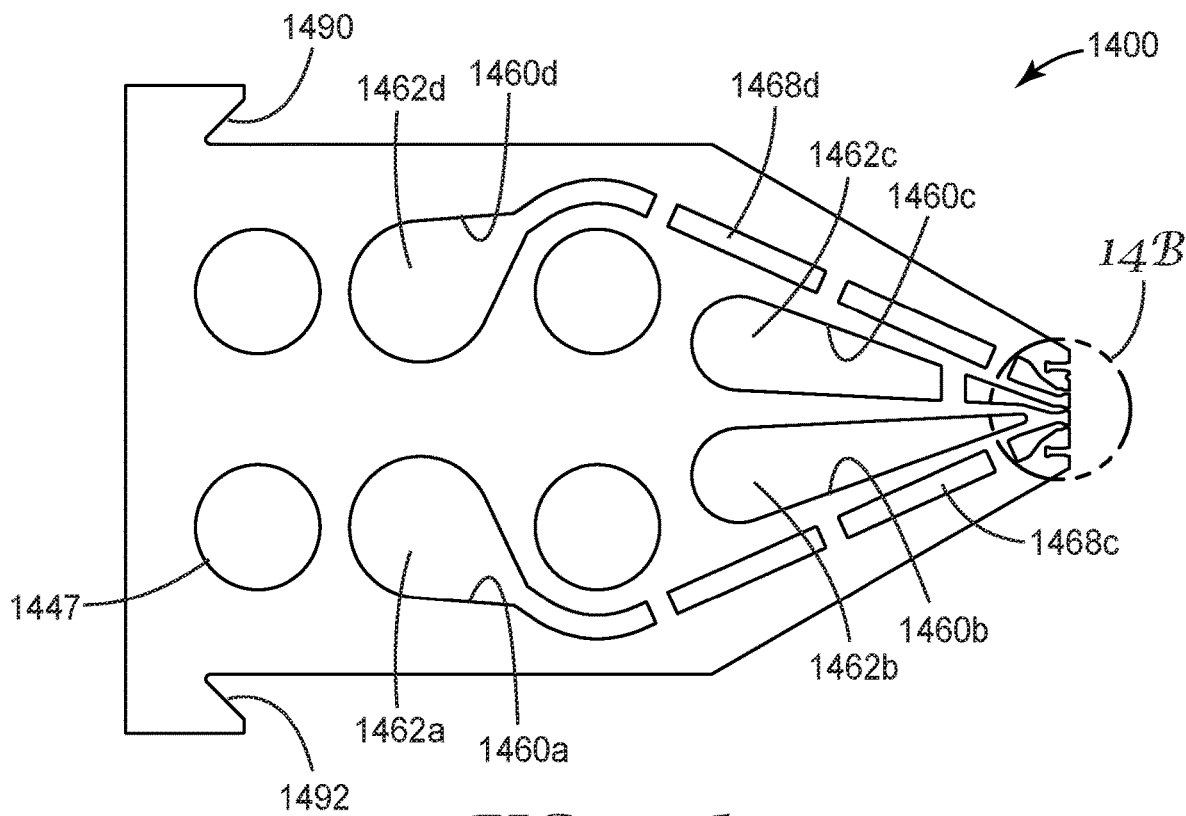
FIG. 14A is a plan view of an exemplary embodiment of a shim suited to form a sequence of shims capable of forming a coextruded polymeric article, for example, as shown in the schematic cross-sectional views of FIG. 2.
Figure 14B:
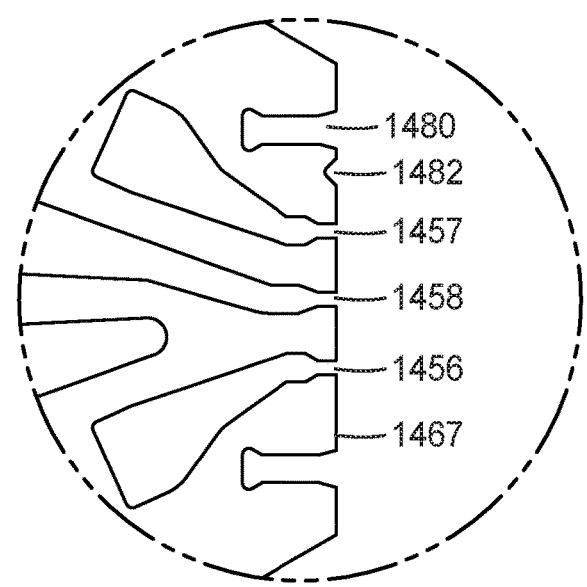
FIG. 14B is an expanded region near the dispensing surface of the shim shown in FIG. 14A.

Referring now to FIGS. 14A and 14B, a plan view of shim 1400 is illustrated. Shim 1400 has first aperture 1460*a*, second aperture 1460*b*, third aperture 1460*c*, and fourth aperture 1460*d*. When shim 1400 is assembled with others as shown in FIG. 18, aperture 1460*a* aids in defining first cavity 1462*a*, aperture 1460*b* aids in defining second cavity 1462*b*, aperture 1460*c* aids in defining third cavity 1462*c*, and aperture 1460*d* aids in defining third cavity 1462*d*. Passageways 1468*a* and 1468*d* cooperate with analogous passageways on adjacent shims to allow passage from cavities 1462*a* and 1462*d* to the dispensing surfaces of the appropriate shims when the shims are assembled as shown in FIG. 18.

Shim 1400 has several holes 1447 to allow the passage of, for example, bolts, to hold shim 1400 and others to be described below into an assembly. Shim 1400 also has dispensing surface 1467, and in this embodiment, dispensing surface 1467 has indexing groove 1480 which can receive an appropriately shaped key to ease assembling diverse shims into a die. The shim may also have identification notch 1482 to help verify that the die has been assembled in the desired manner. This embodiment has shoulders 1490 and 4092 which can assist in mounting the assembled die with a mount of the type shown in FIG. 23. Shim 1400 has dispensing opening 1456, 1457, and 1458. Dispensing opening 1456 has connection to cavity 1462*a*, opening 1457 has connection to cavity 1462*d*, and 1458 has connection to cavity 1462*c*. Opening 1456 and 1457 provides the top and bottom structure of the tube illustrated in FIG. 2.

Figure 15A:
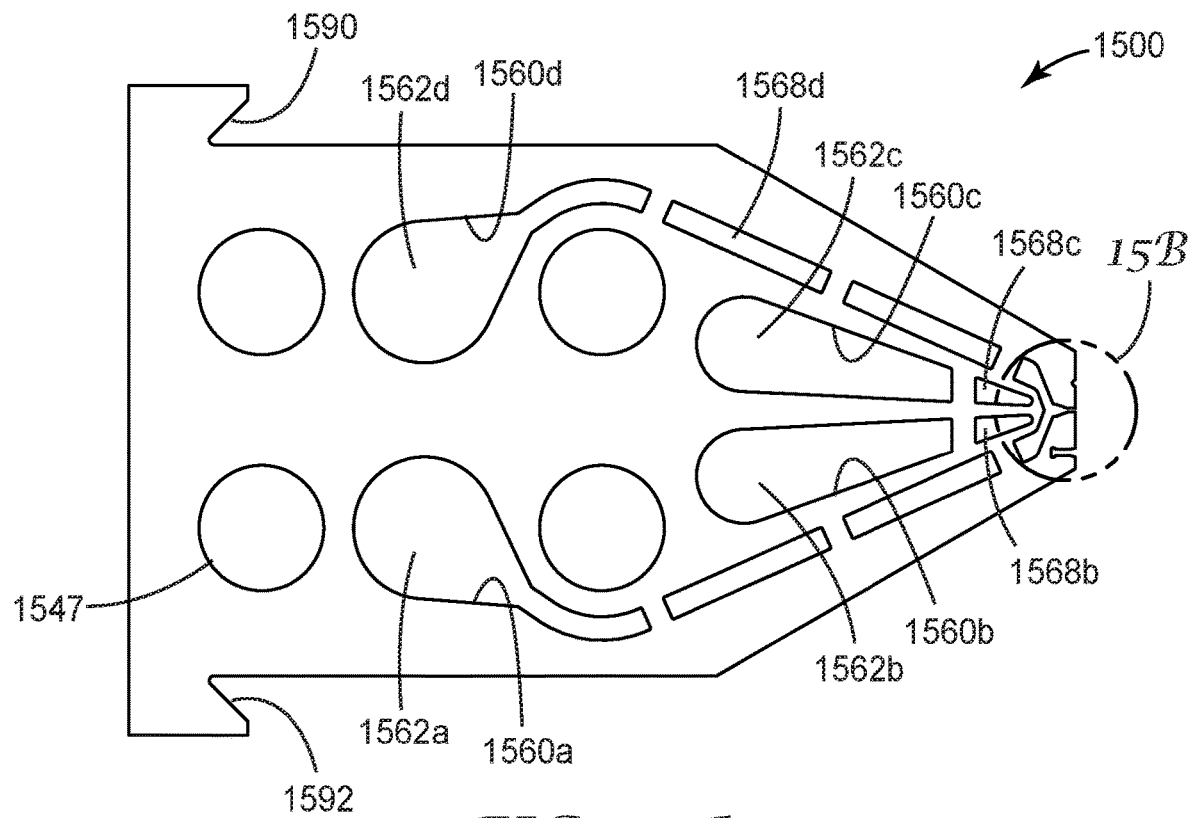
FIG. 15A is a plan view of an exemplary embodiment of a shim suited to form a sequence of shims capable of forming a coextruded polymeric article, for example, as shown in the schematic cross-sectional views of FIG. 1.
Figure 15B:
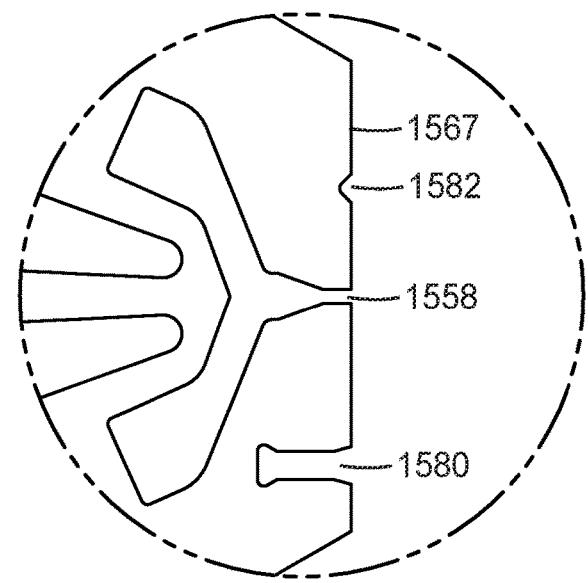
FIG. 15B is an expanded region near the dispensing surface of the shim shown in FIG. 15A.

Referring now to FIGS. 15A and 15B, a plan view of shim 1500 is illustrated. Shim 1500 has first aperture 1560a, second aperture 1560b, third aperture 1560c, and fourth aperture 1560d. When shim 1500 is assembled with others as shown in FIG. 16, aperture 1560a aids in defining first cavity 1562a, aperture 1560b aids in defining second cavity 1562b, aperture 1560c aids in defining third cavity 1562c, and aperture 1560d aids in defining third cavity 1562d. Passageways 1568a and 1568d cooperate with analogous passageways on adjacent shims to allow passage from cavities 1562a, and 1562d to the dispensing surfaces of the appropriate shims when the shims are assembled as shown in FIG. 16.

Shim 1500 has several holes 1547 to allow the passage of, for example, bolts, to hold shim 1500 and others to be described below into an assembly. Shim 1500 also has dispensing surface 1567, and in this embodiment, dispensing surface 1567 has indexing groove 1580 which can receive an appropriately shaped key to ease assembling diverse shims into a die. The shim may also have identification notch 1582 to help verify that the die has been assembled in the desired manner. This embodiment has shoulders 1590 and 1592 which can assist in mounting the assembled die with a mount of the type shown in FIG. 23. Shim 1500 has dispensing opening 1558. Dispensing opening 1558 has connection to cavity 1562a and cavity 1562d and provides the connecting film structure between the tubes illustrated in FIG. 1.

Referring to FIG. 16, a perspective assembly drawing of a several different repeating sequences of shims, collectively 1600, employing the shims of FIGS. 7, 8, 9, 10, 11, and 15 to produce coextruded polymeric article 100 shown in FIG. 1 is shown. It can be seen that collectively the shims form a dispensing surface shown in further detail in FIG. 4.

Referring to FIG. 17, an exploded perspective assembly drawing of a repeating sequence of shims employing the shims of FIGS. 7, 8, 9, 10, 11, and 15 is illustrated. In the illustrated embodiment, the repeating sequence includes, from bottom to top as the drawing is oriented, 1100, 1100, 1500, 1500, 1500, 1500, 1500, 1500, 1100, 1100, 700, 700, 700, 800, 900, 900, 1000, 1000, 900, 900, 800, 700, 700, 700.

Referring to FIG. 18, a perspective assembly drawing of a several different repeating sequences of shims, collectively 2000, employing the shims of FIGS. 7, 8, 10, 11, 13 and 14 to produce coextruded polymeric article 200 shown in FIG. 2 is shown. It can be seen that collectively the shims form a dispensing surface shown in further detail in FIG. 5.

Figure 19:
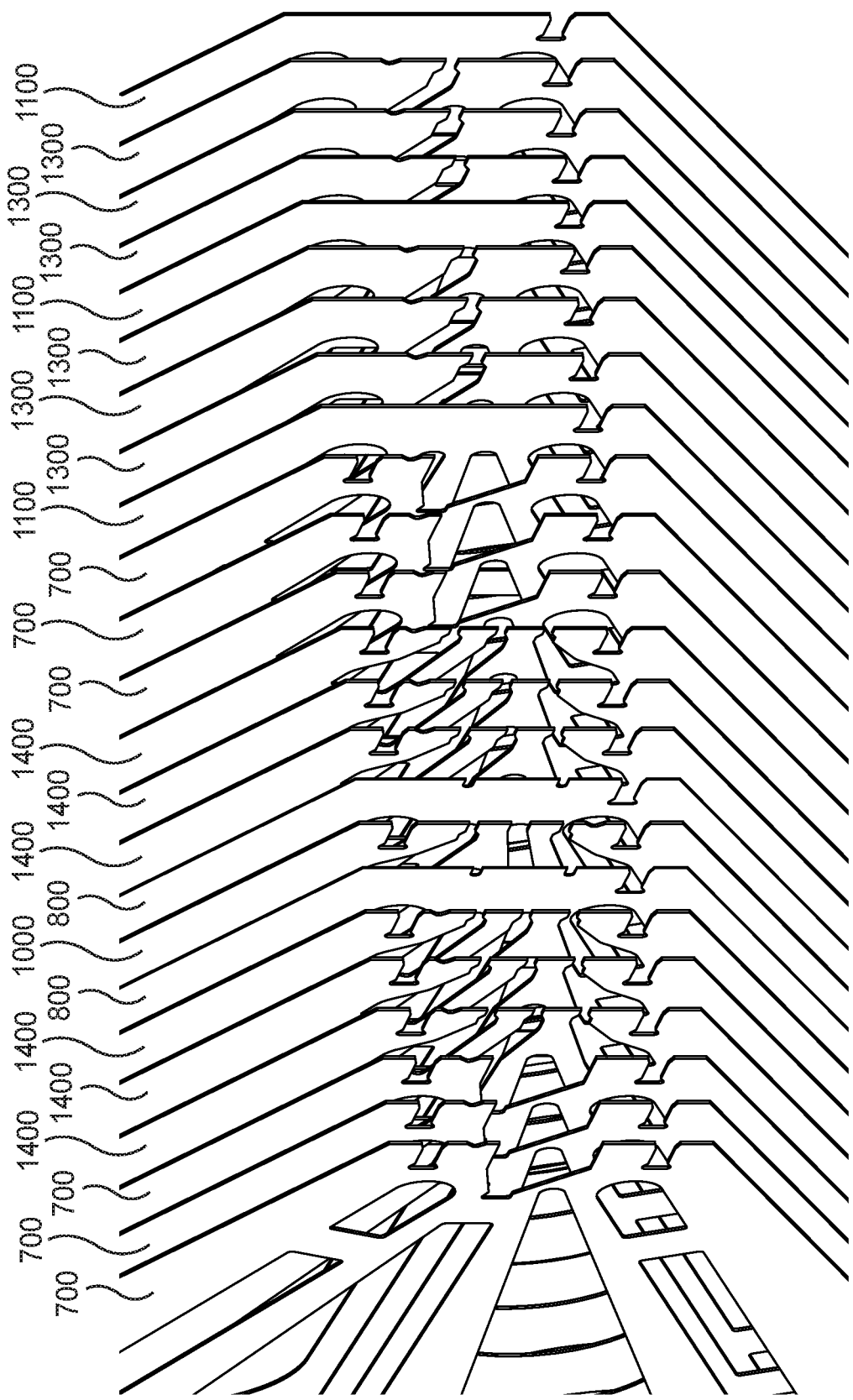
FIG. 19 is a perspective view of the some of the sequence of shims of FIG. 18, further exploded to reveal some individual shims.

Referring to FIG. 19, an exploded perspective assembly drawing of a repeating sequence of shims employing the shims of FIGS. 7, 8, 10, 11, 13, and 14 is illustrated. In the illustrated embodiment, the repeating sequence includes, from bottom to top as the drawing is oriented, 1100, 1300, 1300, 1300, 1100, 1300, 1300, 1300, 1100, 700, 700, 700, 1400, 1400, 1400, 800, 1000, 800, 1400, 1400, 1400, 700, 700, 700.

Referring to FIG. 20, a perspective assembly drawing of a several different repeating sequences of shims, collectively 2000, employing the shims of FIGS. 7, 8, 9, 10, 11, and 12 to produce coextruded polymeric article 300 shown in FIG. 3 is shown. It can be seen that collectively the shims form a dispensing surface shown in further detail in FIG. 6.

Figure 21:
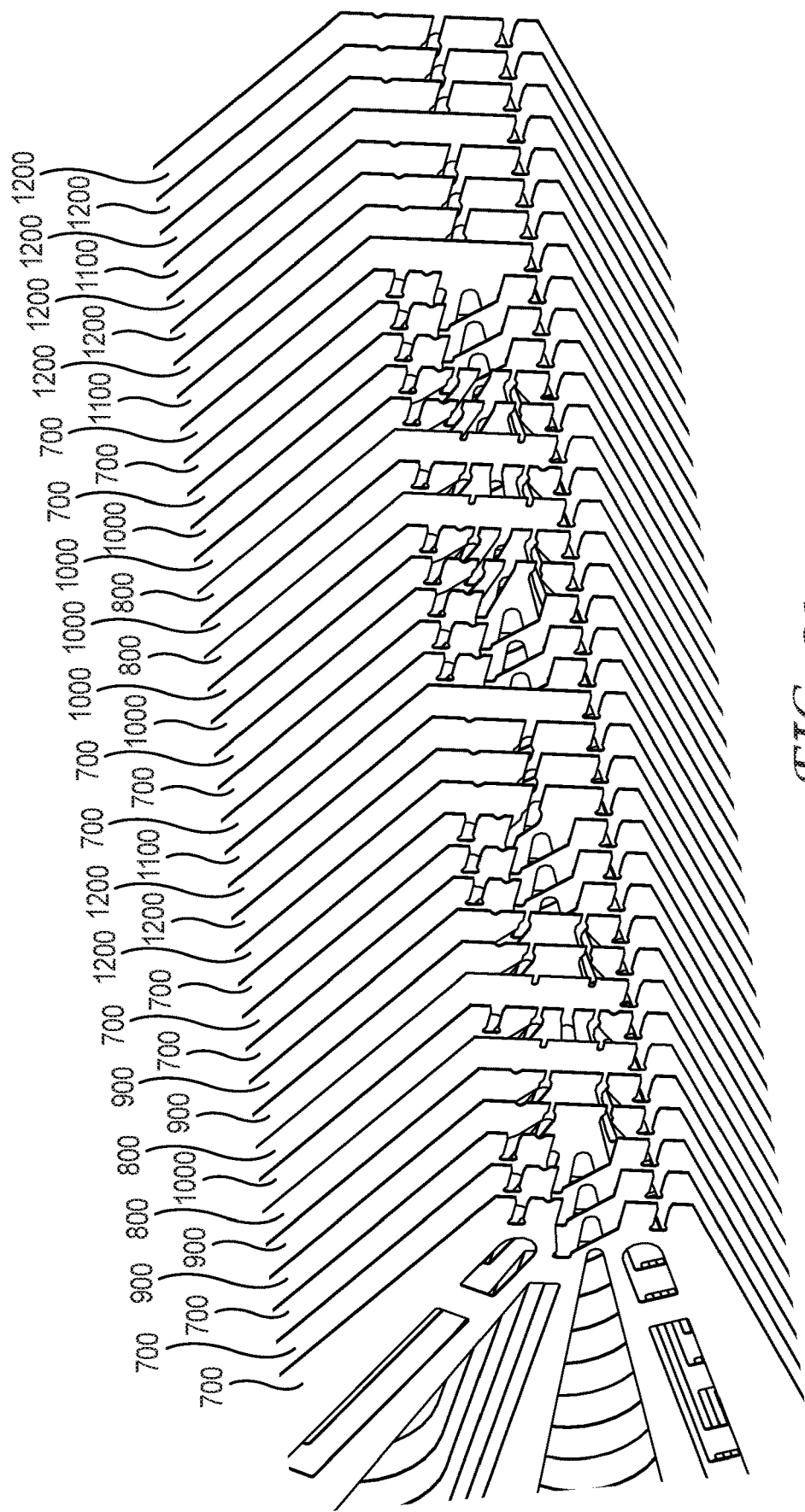
FIG. 21 is a perspective view of the some of the sequence of shims of FIG. 20, further exploded to reveal some individual shims.

Referring to FIG. 21, an exploded perspective assembly drawing of a repeating sequence of shims employing the shims of FIGS. 7, 8, 9, 10, 11, and 12 is illustrated. In the illustrated embodiment, the repeating sequence includes, from bottom to top as the drawing is oriented, 1200, 1200, 1200, 1100, 1200, 1200, 1200, 1100, 700, 700, 700, 1000, 1000, 800, 1000, 800, 1000, 1000, 700, 700, 700, 1100, 1200, 1200, 1200, 700, 700, 700, 900, 900, 800, 1000, 800, 900, 900, 700, 700, 700.

Figure 22:
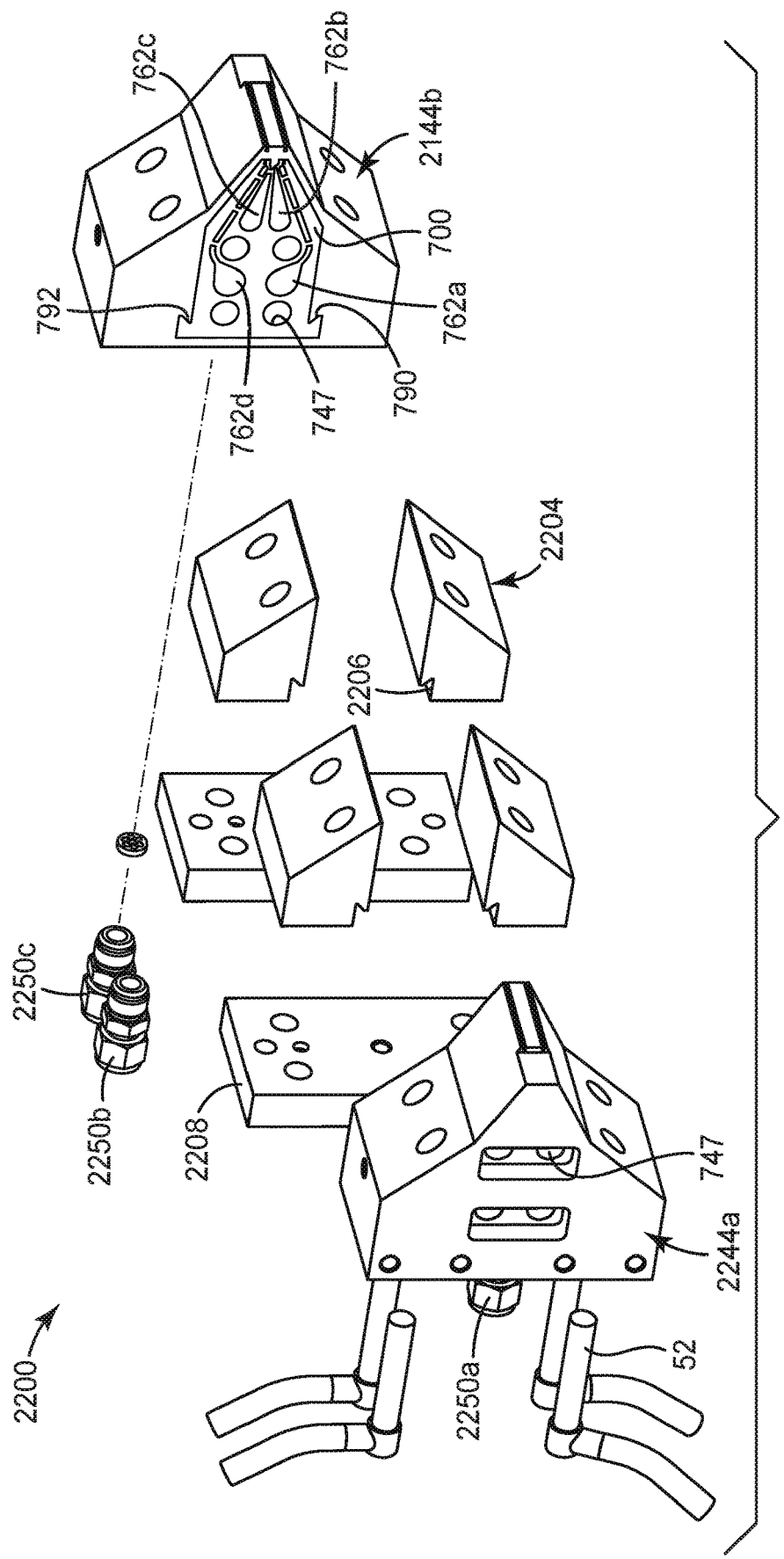
FIG. 22 is an exploded perspective view of an example of a mount suitable for an extrusion die composed of multiple repeats of the sequence of shims of FIG. 11.

Referring to FIG. 22, an exploded perspective view of a mount 2200 suitable for an extrusion die composed of multiple repeats of the repeating sequence of shims of FIGS. 16, 18, and 20 is illustrated. Mount 2200 is particularly adapted to use shims 500, 600, 700, 800, 900, 1000, 1100, 1200, 1300, 1400, and 1500 as shown in FIGS. 7-15. For visual clarity, however, only a single instance of shims is shown in FIG. 22. The multiple repeats of the repeating sequence of shims are compressed between two end blocks 2244a and 2244b. Conveniently, through bolts can be used to assemble the shims to end blocks 1344a and 1344b, passing through holes 747 in shims 700 et al.

In this embodiment, inlet fittings 2250a, 2250b, 2250c, and a fourth fitting not shown provide a flow path for four streams of molten polymer through end blocks 2244a and 2244b to cavities 762a, 762b, and 762c, and 762d. Compression blocks 2204 have notch 2206 that conveniently engages the shoulders on shims (e.g., 790 and 792) on 700. When mount 2200 is completely assembled, compression blocks 2204 are attached by, for example, machine bolts to backplates 2208. Holes are conveniently provided in the assembly for the insertion of cartridge heaters 52.

Figure 23:
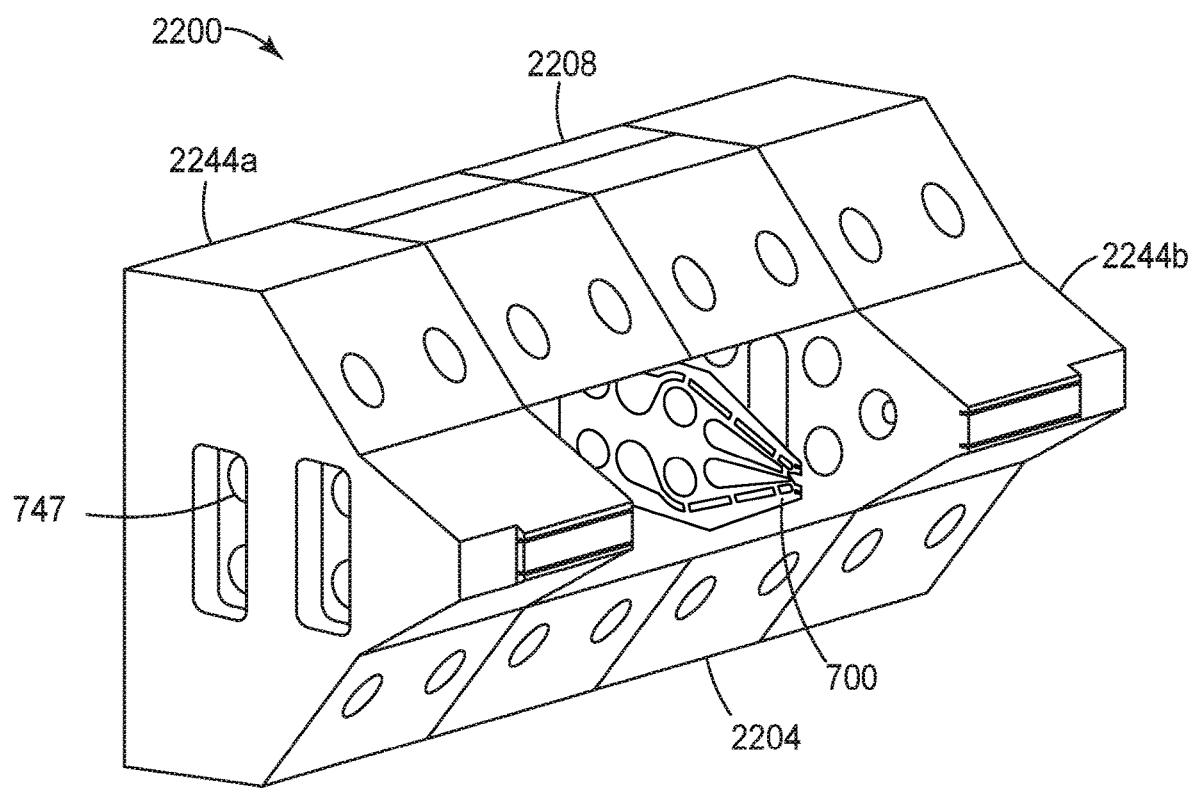
FIG. 23 is a perspective view of the mount of FIG. 22 in an assembled state.

Referring to FIG. 23, a perspective view of the mount 2200 of FIG. 22 is illustrated in a partially assembled state. A few shims, for example, 700 are in their assembled positions to show how they fit within mount 2200, but most of the shims that would make up an assembled die have been omitted for visual clarity.

The size (same or different) of the tube be adjusted, for example, by the composition of the extruded polymers, velocity of the extruded tubes, and/or the orifice design (e.g., cross sectional area (e.g., height and/or width of the orifices)).

Typically, the polymeric tubes are extruded in the direction of gravity. In some embodiments, it is desirable to extrude the tubes horizontally, especially when the extrusion orifices of the first and second polymer are not collinear with each other.

In practicing methods described herein, the polymeric materials might be solidified simply by cooling. This can be conveniently accomplished passively by ambient air, or actively by, for example, quenching the extruded first and second polymeric materials on a chilled surface (e.g., a chilled roll). In some embodiments, the first and/or second polymeric materials are low molecular weight polymers that need to be cross-linked to be solidified, which can be done, for example, by electromagnetic or particle radiation. In some embodiments, it is desirable to maximize the time to quenching to increase the weld strength.

Suitable polymeric materials for extrusion from dies described herein, methods described herein, and for composite layers described herein include thermoplastic resins comprising polyolefins (e.g., polypropylene and polyethylene), polyvinyl chloride, polystyrene, nylons, polyesters (e.g., polyethylene terephthalate) and copolymers and blends thereof. Suitable polymeric materials for extrusion from dies described herein, methods described herein, and for composite layers described herein also include elastomeric materials (e.g., ABA block copolymers, polyurethanes, polyolefin elastomers, polyurethane elastomers, metallocene polyolefin elastomers, polyamide elastomers, ethylene vinyl acetate elastomers, and polyester elastomers) Other desirable materials include, for example, styreneacrylonitrile, cellulose acetate butyrate, cellulose acetate propionate, cellulose triacetate, polyether sulfone, polymethyl methacrylate, polyurethane, polyester, polycarbonate, polyvinyl chloride, polystyrene, polyethylene naphthalate, copolymers or blends based on naphthalene dicarboxylic acids, polyolefins, polyimides, mixtures and/or combinations thereof. Exemplary release materials for extrusion from dies described herein, methods described herein, and for composite layers described herein include silicone-grafted polyolefins such as those described in U.S. Pat. No. 6,465,107 (Kelly) and U.S. Pat. No. 3,471,588 (Kanner et al.), silicone block copolymers such as those described in PCT Pub. No. WO96039349, published Dec. 12, 1996, and low density polyolefin materials such as those described in U.S. Pat. No. 6,228,449 (Meyer), U.S. Pat. No. 6,348,249 (Meyer), and U.S. Pat. No. 5,948,517 (Meyer), the disclosures of which are incorporated herein by reference.

In some embodiments, the first and second polymers are independently a thermoplastic (e.g., adhesives, nylons, polyesters, polyolefins, polyurethanes, elastomers (e.g., styrenic block copolymers), and blends thereof).

In some embodiments, the plurality of tubes includes alternating first and second polymeric tubes.

In some embodiments, the material comprising the tube is different than the material comprising the spacer segment. The materials may differ by additive, by polymer type, by molecular weight or distribution, etc.

In some embodiments, the tubes provide thermal cooling, where the spacer segments connecting the tubing enable a large perimeter of the tubing for heat transfer. Spacer segments provide organization of multiple tubes enabling tubes to be located at uniform distances between each other. This is useful with thermal cooling applications where the thermal transfer distance between the cooling media within the tube and thermal conductive material outside the tube can be optimized for optimal heat transfer rate. The webs described herein where tubes are connected with spacer segments enable the use of large numbers of cooling tubes that can be organized into relatively small spaces. Spacer segments connect to the tubing with a relatively small area, optimizing the tubing heat transfer rate. In some embodiments the perimeter of the tubing is accessible for heat transfer as high as 60 percent of the perimeter, in some cases greater than 80%.

In some embodiments, it may be desirable for the tube to comprise a fluid (e.g., at least one of gas (e.g., air), liquid (e.g., water, ethylene glycol, or mineral oil), or viscous fluid (e.g., thermal grease)) in the core may be desirable, for example, for thermal transport in thermal interface articles used to control the temperature of and/or dissipate heat for electronic components and batteries or mechanical devices. Exemplary gasses include air and inert gases. Exemplary liquids include water and ethylene glycol and mineral oils. In some embodiments, it may be desirable for the tube to comprise an endothermic material (e.g., wax) in the core which absorbs heat when it melts and releases heat when it solidifies. Such embodiments may be useful, for example, for electronic components and batteries or mechanical devices. It is typically necessary to add a filler material as the web is extruded to prevent collapse of the hollow tube. It may be desired to first fill the hollow tube with air with subsequent replacement with a suitable filler material. This can be injected after the web has quenched. In some embodiments the liquid may be used to transport thermal energy through the hollow tube in the machine direction of the hollow tube. In some embodiments, the liquid may be used to transport thermal energy across the thickness direction of the hollow tube from a first face to a second face of the web. In this way the core material provides thermal transport with flexibility to conform to irregular shapes. In this case, higher viscosity materials may be used such as thermal greases.

In some embodiments, the first polymeric tubess and the second polymeric tubes are both formed with a hollow core arrangement. In particular, the first polymeric tubes may have a sheath of polymeric material different than the second polymeric tubes. The die design for this scenario will necessarily have at least four cavities.

In some embodiments, polymeric materials used to make webs described herein may comprise a colorant (e.g., pigment and/or dye) for functional (e.g., optical effects) and/or aesthetic purposes (e.g., each has different color/shade). Suitable colorants are those known in the art for use in various polymeric materials. Exemplary colors imparted by the colorant include white, black, red, pink, orange, yellow, green, aqua, purple, and blue. In some embodiments, it is desirable level to have a certain degree of opacity for one or more of the polymeric materials. The amount of colorant(s) to be used in specific embodiments can be readily determined by those skilled in the (e.g., to achieve desired color, tone, opacity, transmissivity, etc.). If desired, the polymeric materials may be formulated to have the same or different colors. When colored tubes are of a relatively fine (e.g., less than 50 micrometers) diameter, the appearance of the web may have a shimmer reminiscent of silk.

In some embodiments, the tubes are within the same plane.

In some embodiments, webs described herein have a thickness up to 750 (in some embodiments, up to, 500, 100, 50, or even up to 25; in a range from 10 to 750, 10 to 500, 10 to 100, 10 to 50, or even 10 to 25) micrometers.

In some embodiments, the polymeric tubes have an average tube wall thickness in a range from 0.025 to 0.25 micrometers. In some embodiments, the spacers have an average length in a range from 0.025 to 2 micrometers.

In some embodiments, the polymeric tubes have an average cross-sectional diameter in a range from 0.05 to 2 mm.

In some embodiments, at least 25 (in some embodiments, at least 30, 35, 40, 45, 50, 55, 60, 65, 70, 75, 80, 85, 90, 95, or even 100) percent by number hollow polymeric tubes each have a hollow cross-sectional area in a range from 0.2 to 1 (in some embodiments, in a range from 0.1 to 2, or even 0.1 to 5) $mm^2$.

In some embodiments, the polymer comprises a filler material (e.g., aluminum oxide, aluminum nitride, aluminum trihydrate, boron nitride, aluminum, copper, graphite, graphene, magnesium oxide, zinc oxide) to provide thermal conductivity.

In some embodiments, the array of polymeric tubes exhibits at least one of oval-shaped, or circle-shaped cross section, openings.

In some embodiments, at least some of spaces between tubes of web described herein are filled with thermally conductive material (i.e., materials having a thermal conductivity of at least 0.5 watts per meter kelvin). Exemplary thermally conductive materials include functional particles of (e.g., aluminum oxide, aluminum nitride, aluminum trihydrate, boron nitride, aluminum, copper, graphite, graphene, magnesium oxide, zinc oxide) to provide desired thermal properties to articles described herein. In some embodiments, it may be desirable for the area surrounding and within the web to comprise a viscous fluid (e.g., at least one of liquid or solid (e.g., thermal grease)) within the web. In some embodiments, it may be desirable for the area surrounding and within the web to comprise an endothermic material (e.g., wax) in the core which absorbs heat when it melts and releases heat when it solidifies. Such embodiments may be useful, for example, for electronic components and batteries or mechanical devices. Such materials provided into the void space of the web by smearing and doctoring the coatings into the void spaces.

In some embodiments, the polymeric tubes have a down web direction, for example t direction as shown in FIG. 1 and a cross-web direction. The polymeric tubes extends substantially in a down-web direction.

Some embodiments of webs described herein where the sheathed core of fluid (e.g., at least one of gas (e.g., air) or liquid (e.g., water, ethylene glycol, or mineral oil)) are useful, for example, for as padding and spacer materials (e.g., for personal padding and packaging applications).

Additional information that may be useful in making and using tubes described therein, when combined with the instant disclosure, can be found in U.S. Pat. Pub. No. 2014/0220328 A1 (Ausen et al.), the disclosure of which is incorporated herein by reference.

Exemplary Embodiments

Embodiment 1 is a web comprising, an array of discrete polymeric tubes; and a plurality of spacer segments between at least a plurality of adjacent polymeric tubes; wherein polymeric tubes are hollow polymeric tubes; wherein the web is a continuous web.

Embodiment 2 is the web of embodiment 1, wherein the tubes are within the same plane.

Embodiment 3 is the web of embodiment 1, wherein the tubes are within the two or more planes.

Embodiment 4 is the web of any of embodiments 1-3, wherein the web has a thickness up to 750 micrometers.

Embodiment 5 is the web of any of embodiments 1-4, wherein the web is an extruded web.

Embodiment 6 is the web of any of embodiments 1-5, wherein the tubes have a hollow cross-sectional area in a range from 0.2 to 1 mm$^2$.

Embodiment 7 is the web of any of embodiments 1-6, wherein the tubes have a tube wall thickness in a range from 0.025 to 0.25 mm.

Embodiment 8 is the web of any of embodiments 1-7, wherein the tubes have an average cross-sectional diameter in a range from 0.05 to 2 mm.

Embodiment 9 is the web of any of embodiments 1-8, wherein the spacer segments have a length in a range from 0.025 to 2 mm.

Embodiment 10 is the web of any of embodiments 1-9, further comprising a gas or liquid in at least some of the tubes.

Embodiment 11 is the web of any of embodiments 1-10, further comprising thermally conductive material in at least some of the tubes.

Embodiment 12 is the web of any of embodiments 1-11, wherein the tubes extends substantially in a down-web direction.

Embodiment 13 is a method of making the web of any of embodiments 1-12, the method comprising: providing an extrusion die comprising a plurality of shims positioned adjacent to one another, the shims together defining at least a first cavity, a second cavity, and a third cavity, and a dispensing surface, wherein the dispensing surface has an array of alternating dispensing orifices, wherein the plurality of shims comprises a plurality of a repeating sequence of shims, wherein the repeating sequence comprises: shims that provide a fluid passageway between the second cavity and a second plurality of orifices, and shims that provide a fluid passageway between the first cavity to a first plurality of enclosed polygon shaped orifices, and also that provide a third passageway extending from a third cavity to a third plurality of orifices located within the enclosed polygon orifice area; and dispensing first polymeric tubes from the first dispensing orifices while simultaneously dispensing spacer segments from the second dispensing orifices and providing an open air passageway for the third cavity and the third dispensing orifices.

Embodiment 14 is the method of embodiment 13, wherein the third passageway is filled with gas.

Embodiment 15 is a method of making the web of any of embodiments 1-12, the method comprising:
providing an extrusion die comprising an array of orifices positioned close to one another such that material dispensed from the orifices welds together once they exit the orifices,
wherein a first die cavity is connected to a plurality of enclosed polygon shaped orifices, a second die cavity is connected to a plurality of spacer orifices, and a third cavity is connected to a third plurality of orifices located within the enclosed polygon orifice area; and
dispensing first polymeric tubes from the first dispensing orifices while simultaneously dispensing spacer segments from the second dispensing orifices, and providing an open air passageway for the third cavity and the third dispensing orifices.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

Example 1

A web, as generally depicted in FIG. 1, was prepared as follows. A co-extrusion die as generally depicted in FIGS. 22 and 23 and assembled with a multi-shim repeating pattern of extrusion orifices as generally illustrated in FIGS. 16 and 17, was prepared. The thickness of the shims in the repeat sequence was 4 mils (0.102 mm) for shims 700, 900, 1000, 1100, and 1500. The thickness of shim 800 was 2 mils (0.051 mm). These shims were formed from stainless steel, with perforations cut by wire electrical discharge machining (wire EDM). The shims were stacked in a repeating sequence 700, 700, 700, 800, 900, 900, 1000, 1000, 900, 900, 800, 700, 700, 700, 1100, 1100, 1500, 1500, 1500, 1500, 1500, 1500, 1100, 1100. Note that shims 700 and 1000 can be oriented in two possible configurations. For this Example, shim 700 was oriented to utilize a first center cavity, and shim 1000 was oriented to utilize a second center cavity. This second center cavity provided air to the center of the tube. This configuration created a repeating length of 92 mils (2.34 mm), with cavities, passageways, and orifices, such that the first extruder fed the cavities and passageways for the top and bottom of the tubular channel and the orifice for the connecting film section, and the second extruder fed the cavity and passageways for the orifices for the sidewalls of the tubular channel. The shims were assembled with the other parts shown to create a die approximately 8 cm in width. The extrusion orifices were aligned in a collinear arrangement, alternating between tubular channels and connecting film sections, resulting in a dispensing surface at the die exit. \

The two inlet fittings on each of the two end blocks were connected to two conventional single-screw extruders via neck tubes. The extruders feeding the two cavities of the die were each fed polyethylene (obtained under the trade designation ELITE 5230 from Dow Chemical, Midland, MI). A separate cavity was used to supply compressed air into the tubular channels. A valve and regulator was used to limit the airflow to the die cavity. The airflow was further regulated with an in-line connected tube which ended in a container of water, the end of the tube submerged 5 mm below water, to maintain a constant pressure inside the cavity.

The melt was extruded vertically into an extrusion quench nip takeaway apparatus. The quench roll was a smooth temperature-controlled chrome plated 20 cm diameter steel roll. The quench nip temperature was controlled with internal water flow. The web path wrapped 180 degrees around the chrome steel roll and then proceeded to a windup roll.

Other process conditions are listed below:

| | |
|---|---|
| Flow rate for the first extruder | 0.7 kg/hr. |
| Flow rate for the second extruder | 1.1 kg/hr. |
| Extrusion temperature | 190° C. |
| Quench roll temperature | 10° C. |
| Quench takeaway speed | 1.2 m/min. |

An optical microscope was used to measure web dimensions:

| | |
|---|---|
| Total Caliper: | 1.5 mm |
| Tube wall thickness: | 0.13 mm |
| Crossweb tube repeat: | 2.4 mm |
| Connecting film caliper: | 0.3 mm |
| Connecting film segment length: | 0.3 mm |
| Percent of tube wall unconnected | 89% |

Figure 24:
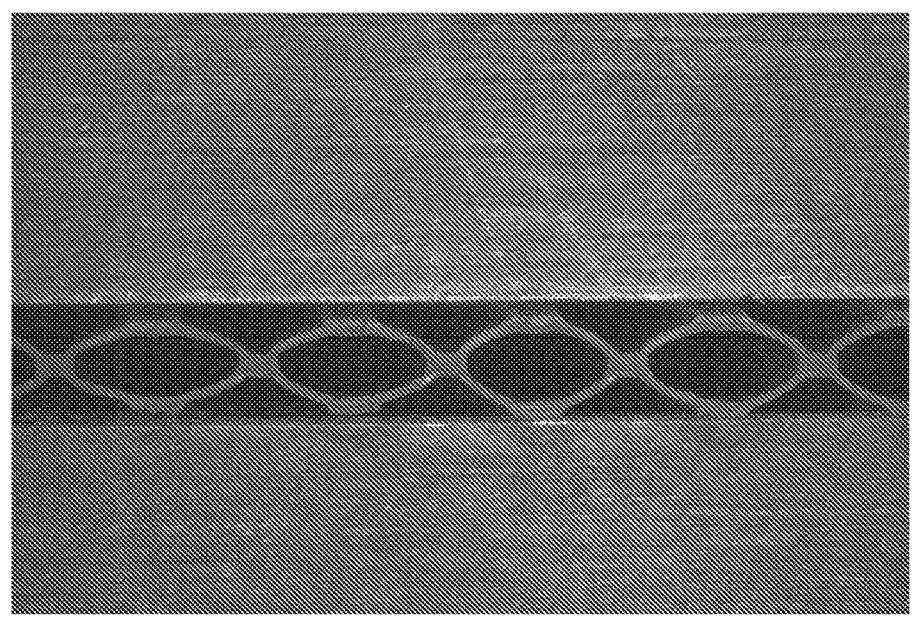
FIG. 24 is an optical image of the Example 1 article.

A micrograph of the web in cross section is shown in FIG. 24.

Example 2

A web, as generally depicted in FIG. 2, was prepared as follows. A co-extrusion die as generally depicted in FIGS. 22 and 23 and assembled with a multi-shim repeating pattern of extrusion orifices as generally illustrated in FIGS. 18 and 19, was prepared. The thickness of the shims in the repeat sequence was 4 mils (0.102 mm) for shims 700, 900, 1000, 1100, 1300 and 1400. The thickness of shim 800 thickness was 2 mils (0.051 mm). These shims were formed from stainless steel, with perforations cut by wire electrical discharge machining (wire EDM). The shims were stacked in a repeating sequence 700, 700, 700, 1400, 1400, 1400, 800, 1000, 800, 1400, 1400, 1400, 700, 700, 700, 1100, 1300, 1300, 1300, 1100, 1300, 1300, 1300, 1100. For this example, shim 700 was oriented to utilize a first center cavity, and shim 1000 was oriented to utilize a second center cavity. This second cavity provided air to the center of the tube. The first center cavity utilized by shim 700 is the same cavity as utilized by shim 1300. This configuration created a repeating length of 88 mils (2.24 mm), with cavities, passageways, and orifices, such that the first extruder fed the cavities and passageways for the top and bottom of the tubular channel, and the second extruder fed the cavity and passageways and the orifices for the sidewalls of the tubular channel, the connecting film section inside the tubular channel, and also the connecting film section between tube channels. The shims were assembled with the other parts shown to create a die approximately 8 cm in width. The extrusion orifices were aligned in a collinear arrangement, alternating between tubular channels and connecting film sections, resulting in a dispensing surface at the die exit.

The two inlet fittings on each of the two end blocks were connected to two conventional single-screw extruders via neck tubes. The extruders feeding the two cavities of the die were each fed polyethylene (obtained under the trade designation ELITE 5230 from Dow Chemical, Midland, MI). A separate cavity was used to supply compressed air into the tubular channels. A valve and regulator was used to limit the airflow to the die cavity. The airflow was further regulated with an in-line connected tube which ended in a container of water, the end of the tube submerged 5 mm below water, to maintain a constant pressure inside the cavity.

The melt was extruded vertically into an extrusion quench nip takeaway apparatus. The quench roll was a smooth temperature-controlled chrome plated 20 cm diameter steel roll. The quench nip temperature was controlled with internal water flow. The web path wrapped 180 degrees around the chrome steel roll and then proceeded to a windup roll.

Other process conditions are listed below:

| | |
|---|---|
| Flow rate for the first extruder | 1.1 kg/hr. |
| Flow rate for the second extruder | 1.8 kg/hr. |
| Extrusion temperature | 190° C. |
| Quench roll temperature | 10° C. |
| Quench takeaway speed | 0.9 m/min. |

An optical microscope was used to measure web dimensions:

| | |
|---|---|
| Total Caliper: | 2.6 mm |
| Tube wall thickness: | 0.20 mm |
| Crossweb tube repeat: | 1.95 mm |
| Connecting film caliper: | 0.25 mm |
| Connecting film segment length: | 0.5 mm |
| Percent of tube wall pair unconnected | 93% |

Figure 25:
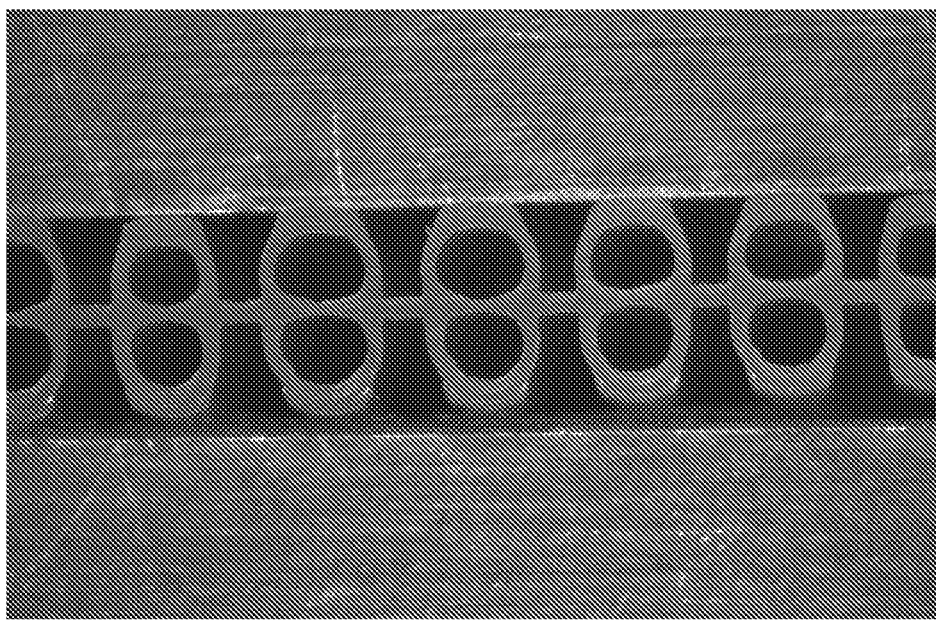
FIG. 25 is an optical image of the Example 2 article.

A micrograph of the web in cross section is shown in FIG. 25.

Example 3

A web, as generally depicted in FIG. 3, was prepared as follows. A co-extrusion die as generally depicted in FIGS. 22 and 23 and assembled with a multi-shim repeating pattern of extrusion orifices as generally illustrated in FIGS. 20 and 21, was prepared. The thickness of the shims in the repeat sequence was 4 mils (0.102 mm) for shims 700, 900, 1000, 1100, and 1200. The thickness of shim 800 was 2 mils, (0.051 mm). These shims were formed from stainless steel, with perforations cut by wire electrical discharge machining (wire EDM). The shims were stacked in a repeating sequence 700, 700, 700, 900, 900, 800, 1000, 800, 900, 900, 700, 700, 700, 1200, 1200, 1200, 1100, 700, 700, 700, 1,000 (flipped), 1,000 (flipped), 800, 1,000, 800, 1,000 (flipped), 1,000 (flipped), 700, 700, 700, 1100, 1200, 1200, 1200, 1100, 1200, 1200, 1200. Note that shim 1000 was stacked in a flipped and un-flipped orientation to utilize 2 separate center cavity feeds. A first center cavity was utilized for shim 700 and shim 1000 in the flipped orientation. A second center cavity was utilized by shim 1000 in the un-flipped orientation and is also utilized by shim 1200. This configuration created a repeating length of 160 mils (4.06 mm) with cavities, passageways, and orifices, such that a first extruder fed the cavities and passageways for the top and bottom of the tubular channel, the tubular sidewalls, and the orifice for the connecting film section. The shims were assembled with the other parts shown to create a die approximately 8 cm in width. The extrusion orifices were aligned in a collinear arrangement, alternating between tubular channels and connecting film sections, resulting in a dispensing surface at the die exit.

The two inlet fittings on each of the two end blocks were connected to two conventional single-screw extruders via neck tubes. The extruders feeding the two cavities of the die were each fed polyethylene (obtained under the trade designation ELITE 5230 from Dow Chemical, Midland, MI). A separate cavity was used to supply compressed air into the tubular channels. A valve and regulator was used to limit the airflow to the die cavity. The airflow was further regulated with an in-line connected tube which ended in a container of water, the end of the tube submerged 5 mm below water, to maintain a constant pressure inside the cavity.

The melt was extruded vertically into an extrusion quench nip takeaway apparatus. The quench roll was a smooth temperature-controlled chrome plated 20 cm diameter steel roll. The quench nip temperature was controlled with internal water flow. The web path wrapped 180 degrees around the chrome steel roll and then proceeded to a windup roll.

Other process conditions are listed below:

| | |
|---|---|
| Flow rate for the first extruder | 0.7 kg/hr. |
| Flow rate for the second extruder | 1.1 kg/hr. |
| Extrusion temperature | 190° C. |
| Quench roll temperature | 10° C. |
| Quench takeaway speed | 1.2 m/min. |

An optical microscope was used to measure web dimensions:

| | |
|---|---|
| Total Caliper: | 1.3 mm |
| Tube wall thickness: | 0.13 mm |
| Crossweb tube repeat: | 2.4 mm |
| Connecting film caliper: | 0.3 mm |
| Connecting film segment length: | 0.2 mm |
| Percent of tube wall | 80% |

Figure 26:
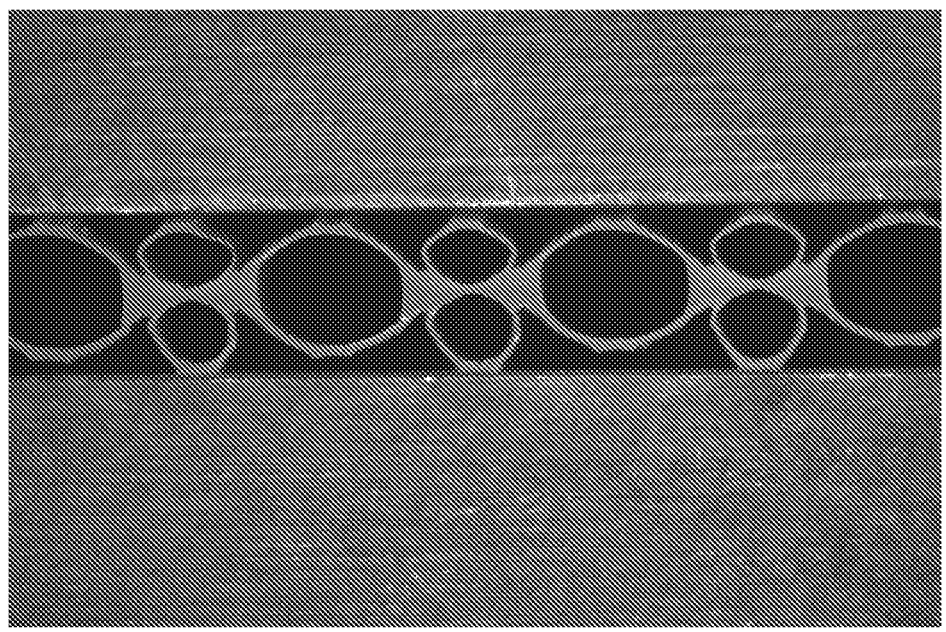
FIG. 26 is an optical image of the Example 3 article.

A micrograph of the web in cross section is shown in FIG. 26.

For further details, see, for example, application having U.S. Ser. No. 62/690,105, filed Jun. 26, 2018, the disclosure of which is incorporated herein by reference.

Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. A web comprising,
    an array of discrete polymeric tubes; and
    a plurality of spacer segments structures between at least a plurality of adjacent polymeric tubes;
    wherein polymeric tubes are hollow polymeric tubes;
    wherein the web is a continuous web; and
    wherein the tubes are within two or more planes.

2. The web of claim 1, wherein the web has a thickness up to 750 micrometers.

3. The web of claim 1, wherein the web is an extruded web.

4. The web of claim 1, wherein the tubes have a hollow cross-sectional area in a range from 0.2 to 1 mm$^2$.

5. The web of claim 1, wherein the tubes have a tube wall thickness in a range from 0.025 to 0.25 mm.

6. The web of claim 1, wherein the tubes have an average cross-sectional diameter in a range from 0.05 to 2 mm.

7. The web of claim 1, wherein the spacer segment structures have a length in a range from 0.025 to 2 mm.

8. The web of claim 1, further comprising a gas or liquid in at least some of the tubes.

9. The web of claim 1, further comprising thermally conductive material in at least some of the tubes.

10. The web of claim 1, wherein the tubes extend substantially in a down-web direction.

11. A method of making the web of claim 1, the method comprising:
    providing an extrusion die comprising a plurality of shims positioned adjacent to one another, the shims together defining at least a first cavity, a second cavity, and a third cavity, and a dispensing surface, wherein the dispensing surface has an array of alternating dispensing orifices, wherein the plurality of shims comprises a plurality of a repeating sequence of shims, wherein the repeating sequence comprises: shims that provide a fluid passageway between the second cavity and a second plurality of orifices, and shims that provide a fluid passageway between the first cavity to a first plurality of enclosed polygon shaped orifices, and also that provide a third passageway extending from a third cavity to a third plurality of orifices located within the enclosed polygon orifice area; and
    dispensing first polymeric tubes from the first dispensing orifices while simultaneously dispensing spacer segment structures from the second dispensing orifices and providing an open air passageway for the third cavity and the third dispensing orifices.

12. The method of claim 11, wherein the third passageway is filled with gas.

13. A method of making the web of claim 1, the method comprising:
    providing an extrusion die comprising an array of orifices positioned close to one another such that material dispensed from the orifices welds together once they exit the orifices,
    wherein a first die cavity is connected to a plurality of enclosed polygon shaped orifices, a second die cavity is connected to a plurality of spacer orifices, and a third cavity is connected to a third plurality of orifices located within the enclosed polygon orifice area; and
    dispensing first polymeric tubes from the enclosed polygon shaped orifices while simultaneously dispensing spacer segment structures from the spacer orifices and providing an open air passageway for the third cavity and the third dispensing orifices.

\* \* \* \* \*